United States Patent
Miyamoto

(10) Patent No.: US 8,151,362 B2
(45) Date of Patent: Apr. 3, 2012

(54) IMAGE FORMING APPARATUS, FUNCTION EXTENDING METHOD AND USER AUTHENTICATION SYSTEM

(75) Inventor: Hirohisa Miyamoto, Kobe (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 217 days.

(21) Appl. No.: 12/720,230

(22) Filed: Mar. 9, 2010

(65) Prior Publication Data

US 2010/0235888 A1    Sep. 16, 2010

(30) Foreign Application Priority Data

Mar. 16, 2009   (JP) .................. 2009-062492

(51) Int. Cl.
    *G06F 21/00*    (2006.01)
(52) U.S. Cl. ........... 726/28; 726/30; 713/187; 380/200; 380/242
(58) Field of Classification Search .......... 726/28; 728/30; 713/165–167; 380/200–242
    See application file for complete search history.

(56) References Cited

U.S. PATENT DOCUMENTS

| | | | | |
|---|---|---|---|---|
| 5,390,247 A * | 2/1995 | Fischer | ............. | 713/176 |
| 6,044,471 A * | 3/2000 | Colvin | ............. | 726/28 |
| 6,223,292 B1 * | 4/2001 | Dean et al. | ............. | 726/28 |
| 6,598,083 B1 * | 7/2003 | Remer et al. | ............. | 709/229 |
| 6,871,284 B2 * | 3/2005 | Cooper et al. | ............. | 726/1 |
| 7,210,040 B2 * | 4/2007 | Jordan | ............. | 713/187 |
| 7,314,169 B1 * | 1/2008 | Jasper et al. | ............. | 235/382 |
| 7,360,253 B2 * | 4/2008 | Frank et al. | ............. | 726/34 |
| 7,373,505 B2 * | 5/2008 | Seltzer et al. | ............. | 713/166 |
| 7,461,135 B2 * | 12/2008 | Murayama et al. | ............. | 709/217 |
| 7,574,610 B2 * | 8/2009 | Willman et al. | ............. | 713/194 |
| 7,660,986 B1 * | 2/2010 | Qiu et al. | ............. | 713/166 |
| 7,716,476 B2 * | 5/2010 | Burkhardt et al. | ............. | 713/167 |
| 2006/0075508 A1 * | 4/2006 | Guo et al. | ............. | 726/27 |

(Continued)

FOREIGN PATENT DOCUMENTS

JP    2002-328908    11/2002

(Continued)

OTHER PUBLICATIONS

Office Action dated Jan. 18, 2011, issued in the corresponding Japanese Patent Application No. 2009-062492, and an English Translation thereof.

(Continued)

*Primary Examiner* — Farid Homayounmehr
(74) *Attorney, Agent, or Firm* — Buchanan Ingersoll & Rooney PC

(57) ABSTRACT

An image forming apparatus includes an user authentication part 31 for executing authentication of a user, a function enabling part 32 for enabling at least one function available for the first user based on authority of the first user set in advance when authentication of the first user executed by the user authentication part 31 results in success, and a function extending part 33 for extending at least one function available for the first user to enable when authentication of the second user executed by the user authentication part 31 results in success with at least one function available for the first user being enabled. Therefore, with a user who is not authorized to use certain function of the image forming apparatus is logging in, function extension is executed for allowing the user to use the certain function temporary.

12 Claims, 29 Drawing Sheets

U.S. PATENT DOCUMENTS

| | | | |
|---|---|---|---|
| 2006/0095630 A1* | 5/2006 | Bashford et al. | 710/305 |
| 2006/0248016 A1* | 11/2006 | Ginter et al. | 705/54 |
| 2007/0283447 A1 | 12/2007 | Hong et al. | |
| 2008/0052784 A1* | 2/2008 | Wiley et al. | 726/28 |
| 2008/0195839 A1* | 8/2008 | Nuyens et al. | 712/1 |
| 2009/0025090 A1* | 1/2009 | Clement et al. | 726/28 |
| 2010/0011449 A1* | 1/2010 | Byszio | 726/28 |
| 2010/0064375 A1* | 3/2010 | Gorczowski et al. | 726/28 |
| 2010/0176916 A1* | 7/2010 | Baucom | 340/5.5 |
| 2011/0093881 A1* | 4/2011 | McCormack et al. | 725/27 |

FOREIGN PATENT DOCUMENTS

| | | |
|---|---|---|
| JP | 2003-006194 | 1/2003 |
| JP | 2007-156698 A | 6/2007 |
| JP | 2007-328784 | 12/2007 |
| JP | 2008-003810 | 1/2008 |
| JP | 2009-012393 | 1/2009 |
| WO | WO 03062753 A1 * | 7/2003 |
| WO | WO 2006042736 A1 * | 4/2006 |

OTHER PUBLICATIONS

Decision of Grant a Patent issued Apr. 12, 2011, in corresponding Japanese Patent Application No. 2009-062492, and an English Translation thereof.

* cited by examiner

FIG. 7

USER AUTHENTICATION INFORMATION  52

| USER | AUTHENTICATION INFORMATION |
|---|---|
| USER A | 100012345 |
| USER B | 100023456 |
| USER C | 100034567 |
| USER D | 100045678 |
| ⋮ | ⋮ |

FIG. 8

USER INFORMATION 53

| USER A | | | 53a, 53b, 53c |
|---|---|---|---|
| FUNCTION SETTING | | ALLOW/RESTRICT | |
| COPY | COLOR COPY | RESTRICT | |
| | USE OF A3 SHEETS | ALLOW | |
| | USE OF REGULAR SHEETS | ALLOW | |
| | ⋮ | ⋮ | |
| SCAN | COLOR DATA | RESTRICT | |
| | TRANSMISSION TO OUTSIDERS | ALLOW | |
| | FAX TRANSMISSION | ALLOW | |
| | ⋮ | ⋮ | |
| DESTINATION SETTING | | REGISTERED ADDRESS | |
| E-MAIL | USER B | E-MAIL ADDRESS | |
| | ⋮ | ⋮ | |
| FAX | ABC | FAX NUMBER | |
| | ⋮ | ⋮ | |
| FTP | USER D | ADDRESS | |
| | ⋮ | ⋮ | |

- 54: USER A row
- 55: FUNCTION SETTING section
- 56: DESTINATION SETTING section

FIG. 19

ADDITIONAL AUTHORITY SPECIFYING INFORMATION  28

| STATUS | | | ADDITIONAL AUTHORITY |
|---|---|---|---|
| DISPLAY SCREEN | AUTHORITY OF LOGGED-IN USER | | |
| COPY BASIC SCREEN | COLOR COPY | RESTRICT | ALLOW |
| | USE OF A3 SHEET | RESTRICT | ALLOW |
| | USE OF REGULAR SHEET | RESTRICT | ALLOW |
| | ⋮ | ⋮ | ⋮ |
| COPY COLOR SETTING SCREEN | BLACK | RESTRICT | ALLOW |
| | COLOR | RESTRICT | ALLOW |
| | ⋮ | ⋮ | ⋮ |
| SCAN BASIC SCREEN | COLOR DATA | RESTRICT | ALLOW |
| | TRANSMISSION TO OUTSIDERS | RESTRICT | ALLOW |
| | FAX TRANSMISSION | RESTRICT | ALLOW |
| | ⋮ | ⋮ | ⋮ |
| SCAN DESTINATION SELECTION SCREEN | SELECTABLE DESTINATION | REGISTERED ADRESS OF LOGGED-IN USER | REGISTERED ADDRESS OF AUTHORITY LENDING USER |
| | ⋮ | ⋮ | ⋮ |

FIG. 26

AUTHORITY LENDING SETTING INFORMATION  58

| USER B | | |
|---|---|---|
| AUTHORITY CAN BE USED | | LENDING TO OTHER USERS (ALLOW/RESTRICT) |
| COPY | COLOR COPY | ALLOW |
| | USE OF A3 SHEET | ALLOW |
| | USE OF REGULAR SHEET | ALLOW |
| | ⋮ | ⋮ |
| SCAN | COLOR DATA | ALLOW |
| | TRANSMISSION TO OUTSIDERS | RESTRICT |
| | FAX TRANSMISSION | RESTRICT |
| | ⋮ | ⋮ |
| REGISTERED DESTINATION | | LENDING TO OTHER USERS (ALLOW/RESTRICT) |
| E-MAIL | USER C | RESTRICT |
| | ⋮ | ⋮ |
| FAX | ABC | RESTRICT |
| | ⋮ | ⋮ |
| FTP | USER C | RESTRICT |
| | ⋮ | ⋮ |

— # IMAGE FORMING APPARATUS, FUNCTION EXTENDING METHOD AND USER AUTHENTICATION SYSTEM

This application is based on the application No. 2009-062492 filed in Japan, the contents of which are hereby incorporated by reference.

BACKGROUND OF THE INVENTION

1. Field of the Invention

The present invention relates to an image forming apparatus, function extending method and user authentication system. The present invention more specifically relates to a technique of extending available function by executing user authentication.

2. Description of the Background Art

In recent years, in image forming apparatuses called as complex devices or MFPs (multifunction peripherals), setting authorities to use any functions may be set for each user in advance. This kind of authority settings of each user is implemented from the perspective of cost management and/or prevention of leakage of information. For example, color image formation which requires toner of multiple hues is generally more costly to be performed than image formation with a toner of a single color. If users who are able to make color copy and/or color printing are restricted, increase in the cost may be controlled. Moreover, in case of making data transmission from the image forming apparatus to an external device, addresses to be selected as destinations are limited for each user, thereby curbing the leakage of information. This type of image forming apparatus executes user authentication when it is to be used. If a user is successfully authenticated, the image forming apparatus transits to a logged-in state in which the authenticated user is logging. In the logged-in state, functions corresponding to authority of the authenticated user are available in the image forming apparatus. When job is executed based on the authenticated user's instructions, job execution history is recorded as log.

According to a conventional technique for executing user authentication as described above, two-staged authorities which are standard authority to use standard functions, and additional authority to use additional functions are set in advance for a user. When a function that the user is trying to use is contained in the additional functions, additional authentication for changing authority to additional authority is executed after executing authentication for using standard functions with standard authority. This technique is disclosed, for example in Japanese patent application laid-open No. 2007-156698. According to the conventional technique, by executing two-staged authentication, unauthorized use by third parties is prevented. As an example, an administrator who has a broad range of use authority leaves from the image forming apparatus after he or she performs user authentication. In this case, unauthorized use of the image forming apparatus with management authority by third parties is prevented.

The two-staged authentication as described above is for a user to make additional functions set for oneself available. So, if a function that the user would like to use is not contained in additional functions which are available with additional authority, the user cannot use the function that he or she would like to use. For instance, in order to limit the use of costly functions such as color copy or color printing by ordinary users, authority to use functions such as color copy or color printing is not contained in standard authority or additional authority set for ordinary users. So, functions such as color copy or color printing are not available for ordinary users even if two-staged authentication is performed.

According to a technique conventionally used as described above, it is assumed that an ordinary user cannot make color copy even if the ordinary user is requested to make a color copy by his or her supervisor. So, the ordinary user requested to make a color copy needs to ask another user who has authority to make color copy for executing the job. If the ordinary user has already logged into the image forming apparatus, he or she needs to perform a log out operation in order for another user to use the image forming apparatus, resulting in cumbersome operations and user-unfriendliness. Also, when job is executed in the image forming apparatus, log is recorded as a job execution history of a logged-in user. Therefore accurate charging control is not executed in above-described case.

Where a user who is unauthorized to make color copy is requested to make a color copy by his or her supervisor as explained above, the function is preferably made temporary available for the requested user while he or she remains logging into the image forming apparatus.

SUMMARY OF THE INVENTION

The present invention is intended to provide an image forming apparatus, an function extending method and a user authentication system that solve the above-described conventional problems. The present invention is intended to realize extension of functions by making a function temporary available while a user unauthorized to use the function is logging into the image forming apparatus.

First, the present invention is directed to an image forming apparatus.

According to one aspect of this invention, the image forming apparatus comprises: a user authentication part for executing authentication of a user; a function enabling part for enabling at least one function available for a first user based on authority of the first user set in advance when authentication of the first user executed by the user authentication part results in success; and a function extending part for extending at least one function available for the first user by adding authority set in advance for a second user in addition to authority of the first user when authentication of the second user executed by the user authentication part results in success with at least one function available for the first user being enabled.

Second, the present invention is directed to a function extending method for extending at least one function available for a user in an image forming apparatus.

According to one aspect of this invention, the function extending method comprises the steps of: (a) executing user authentication of a first user; (b) enabling at least one function available for the first user based on authority of the first user set in advance when authentication of the first user results in success; (c) executing user authentication of a second user with at least one function available for the first user being enabled; and (d) adding authority of the second user in addition to said authority of the first user based on authority set in advance for the second user, and extending at least one function available for the first user when authentication of the second user results in success.

Third, the present invention is directed to an user authentication system comprising an image forming apparatus and an authentication server being capable of establishing data communication with each other.

According to one aspect of this invention, in the user authentication system, the image forming apparatus includes:

a user authentication part for giving a request for authentication to the authentication server, and executing user authentication based on a result of authentication processing executed in the authentication server; a function enabling part for acquiring information relating to authority of a first user, and enabling at least one function available for the first user when the authentication processing of the first user results in success; and a function extending part for acquiring information relating to a second user, and extending said at least one function available for the first user by adding authority set in advance for the second user in addition to authority of the first user when the authentication processing of the second user results in success with at least one function available for the first user being enabled. Further, the authentication server includes: an authentication processing part for executing the authentication processing responsive to the authentication request from the user authentication part; an user information transmission part for transmitting information relating to the first user based on a request from the function enabling part; and an additional authority transmission part for transmitting information relating to the second user based on a request from the function enabling part.

BRIEF DESCRIPTION OF THE DRAWINGS

FIG. 7 is an example of a user authentication information stored in the authentication server;

FIG. 8 is an example of a user information stored in the authentication server;

FIG. 19 is an example of an additional authority specifying information;

FIG. 26 shows an example of an authority lending setting information stored in the authentication server;

DESCRIPTION OF THE PREFERRED EMBODIMENTS

Figure 1:
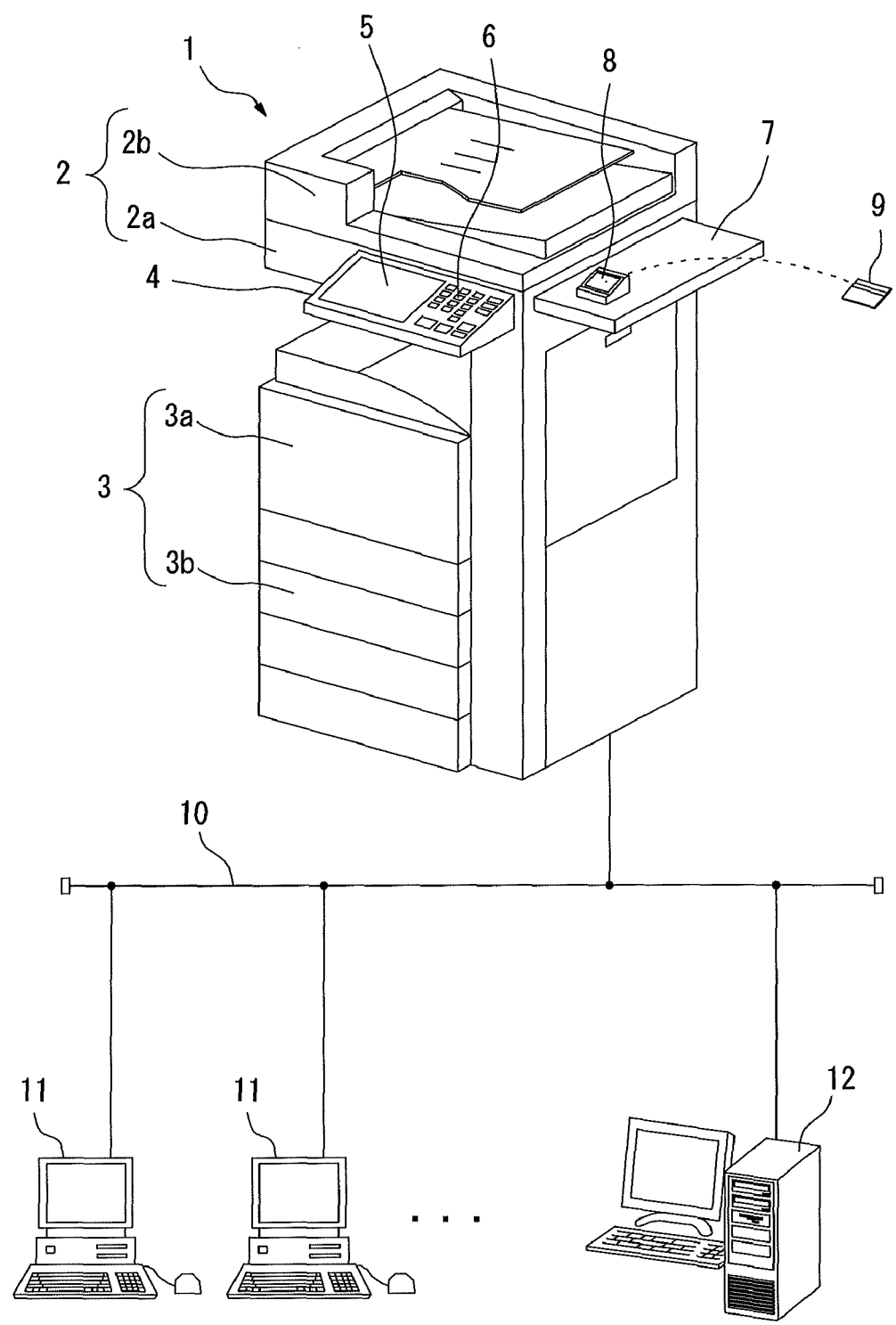
FIG. 1 shows an exemplary configuration of a user authentication system comprising an image forming apparatus and an authentication server.

Preferred embodiment of the present invention is described in detail below with reference to figures. In the description given below, those elements which are shared in common among figures are represented by the same reference numerals, and these elements are not discussed repeatedly for the same description.

(First Preferred Embodiment)

FIG. 1 shows an exemplary configuration of a user authentication system of the first preferred embodiment. The user authentication system comprises as components of its configuration an image forming apparatus 1, a plurality of computers 11 and an authentication server 12. These components are connected to each other to establish data communication with each other through a network 10 such as LAN.

The image forming apparatus 1 is an apparatus what is generally called a complex device or MFPs (multifunction peripherals) having several functions including a copy function, a scan function, a FAX function, a print function, and others. This image forming apparatus 1 includes a scanner unit 2 set at the upper part of the apparatus body and a printer unit 3 set at the lower part of the apparatus body. The scanner unit 2 includes an image reading unit 2a responsible for optically reading images of a document, and an automatic document feeder (ADF) 2b capable of holding a document with multiple pages placed thereon. The automatic document feeder 2b automatically feeds each page of a document one by one placed thereon to the image reading unit 2a. The printer unit 3 includes an image forming unit 3a for forming an image by transferring a toner image to a print medium such as an output sheet and a paper delivery unit 3b for supplying output sheets one by one to the image forming unit 3a.

The image forming apparatus 1 has a support member 7 in a form of a shelf board on the lateral side of itself. An authentication information reader 8 is provided on the upper surface of the support member 7. This authentication information reader 8 is responsible for reading authentication information at user authentication from an authentication information recording medium 9 such as IC card without contacting. The authentication information reader 8 is electronically connected with the image forming apparatus 1. In response to read instructions given from the image forming apparatus 1, the authentication information reader 8 reads authentication information recorded in the authentication information recording medium 9, and outputs to the image forming apparatus 1. The authentication information recording medium 9 is, for example, a recording medium individually distributed to users who use the image forming apparatus 1. In this case, authentication information for identifying a distributed user is recorded in the authentication information recording medium 9. So, if a user differs, authentication information recorded in the authentication information recording medium 9 differs.

Figure 2:
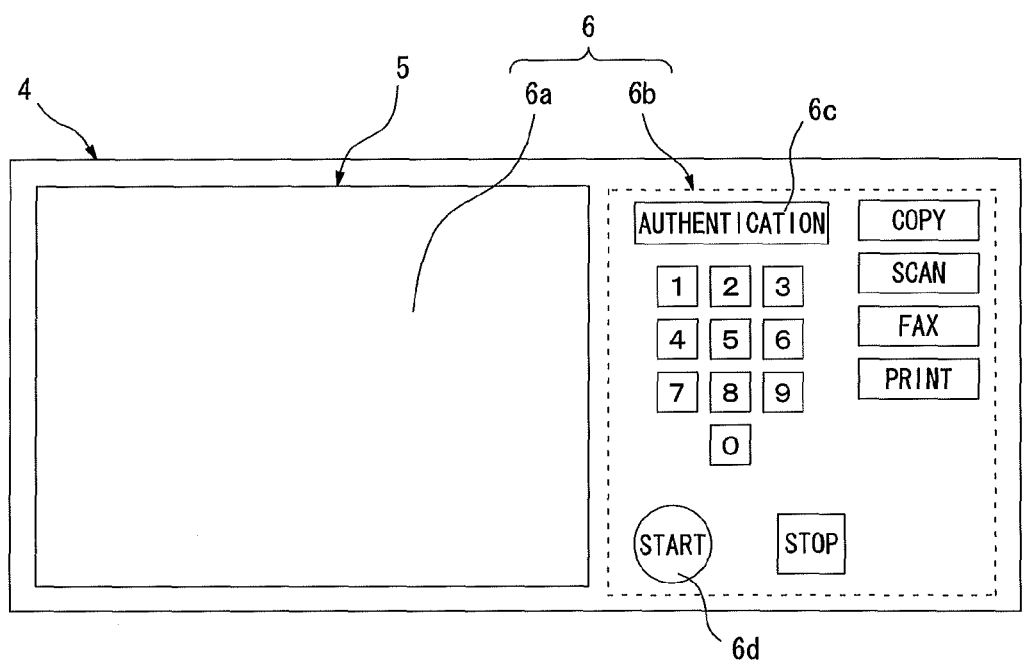
FIG. 2 is a front view diagram showing an enlarged operational panel of the image forming apparatus.

The image forming apparatus 1 has an operational panel 4 operable by a user on the front side of the scanner unit 2. The operational panel 4 has a display unit 5 for displaying various types of information to users, and an operation unit 6 through which the user performs input operation to the image foiining apparatus 1. FIG. 2 is a front view diagram showing the enlarged operational panel 4. The display unit 5 is, for instance, formed by a liquid crystal display capable of displaying color images. As an example, when a user uses the image forming apparatus 1, a display screen such as an operation guidance screen relating to a function selected by the user is shown on this display unit 5. The operation unit 6 is formed by a plurality of operation keys including touch panel keys 6a arranged on a surface of the display unit 5, and a plurality of push-button keys 6b arranged around the display unit 5.

As illustrated in FIG. 2, the push-button keys 6b include an authentication key 6c and a start key 6d. The authentication key 6c is for giving instructions for execution of user authentication to the image forming apparatus 1. In response to user's operation of the authentication key 6c, the image forming apparatus 1 outputs read instructions to the authentication information reader 8, and acquires authentication information read from the authentication information recording medium 9 by the authentication information reader 8. The start key 6b is giving instructions for the image forming apparatus 1 to start execution of a job. In response to user's operation of the start key 6b, the image forming apparatus 1 starts execution of a job specified by the user.

The user is able to select at least one function used for execution of a job from more than one functions for which the user is authorized to use by operating other operation keys of the operation unit 6. Further, as the user performs input operation with viewing a display screen displayed on the display unit 5, he or she can input settings of the selected function.

Figure 3:
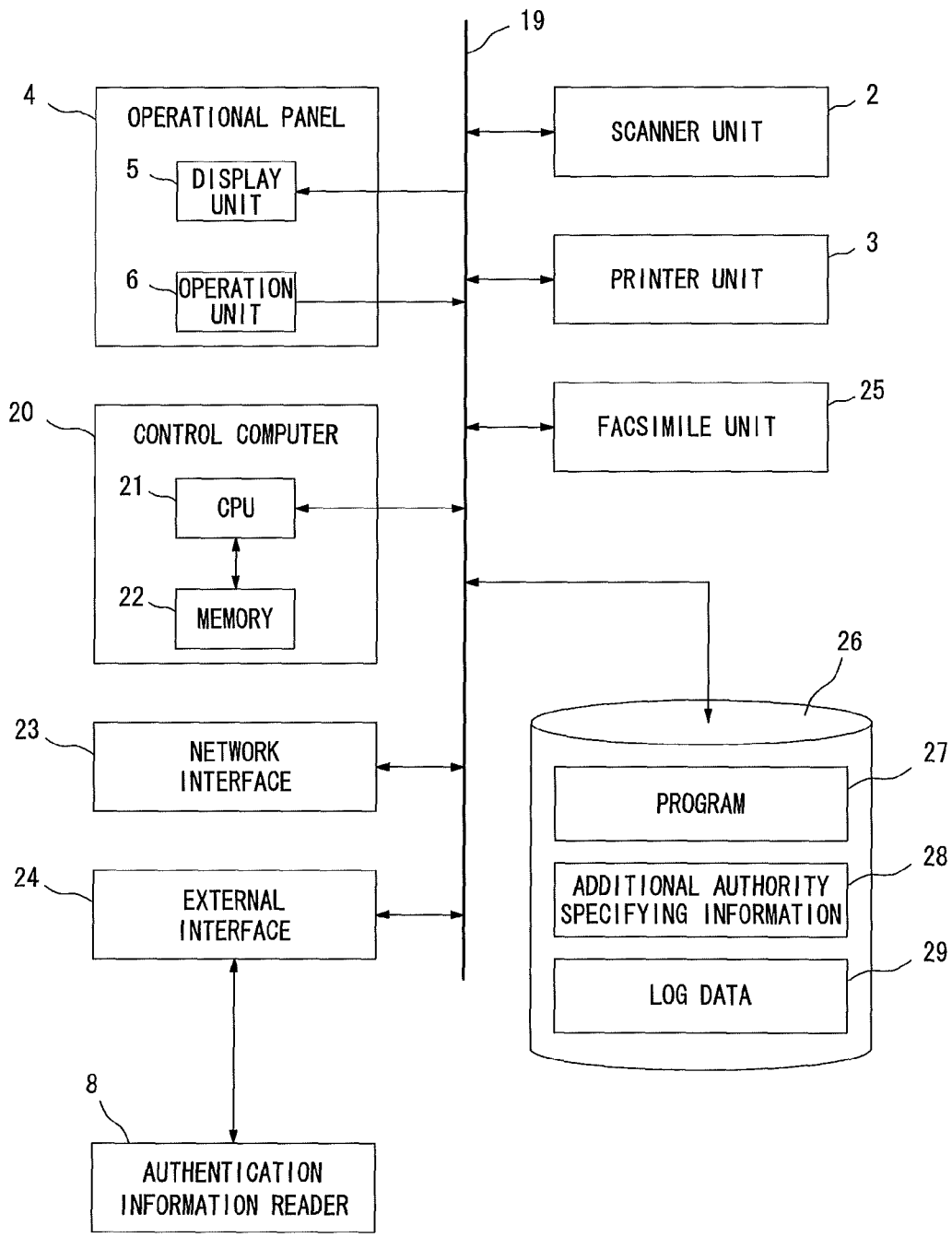
FIG. 3 is a block diagram showing the hardware configuration of the image forming apparatus.

FIG. 3 is a block diagram showing the hardware configuration of the image forming apparatus 1. The image forming apparatus 1 includes a control computer 20, a network interface 23, an external interface 24, a facsimile unit 25 and a storage unit 26 in addition to the scanner unit 2, the printer unit 3, the operational panel 4 and the authentication information reader 8 as described above. These components are connected to each other through a data bus 19 in a manner that allows data input and output to and from each component.

The control computer 20 includes a CPU 21 which reads a program 27 stored in the storage unit 26 and executes the read program 27, and a memory 22 in which various types of data is stored temporarily when the CPU 21 executes processing based on the program 27. The control computer 20 executes a variety of data processing and controls the operation of other hardware sections. By way of example, the control computer 20 creates a screen to be displayed on the display unit 5 of the operational panel 4 and outputs the screen created thereby to the display unit 5. Also, when an operation is made on the operation unit 6 by a user, the control computer 20 detects the operation and executes processing based on the user's operation.

The network interface 23 is for connecting the image forming apparatus 1 to the network 10. Where user authentication is executed in the image forming apparatus 1, for example, data communication between the authentication server 12 and the control computer 20 is established through the network interface 23.

The external interface 24 such as USB interface is for connecting the authentication information reader 8 with the image forming apparatus 1. When user authentication is executed in the image forming apparatus 1, the control computer 20 outputs read instructions to the authentication information reader 8, and inputs the authentication information read by the authentication information reader 8 through the external interface 24.

The facsimile unit 25 transmits and receives facsimile data. Communication network which is not illustrated in the FIG. 3 is connected to the facsimile unit 25. When transmitting facsimile data for example, the control computer 20 outputs the facsimile data to the facsimile unit 25. Then, the facsimile unit 25 connects to the communication network, thereby transmitting the facsimile data to designated destinations.

The storage unit 26 is a nonvolatile storage device formed by a hard disk device and the like. In this storage unit 26, the program 27 explained above is stored. The storage unit 26 stores therein various kinds of data besides the program 27. In the example of FIG. 3, an additional authority specifying information 28, a log data 29 and others are stored in the storage unit 26.

Figure 4:
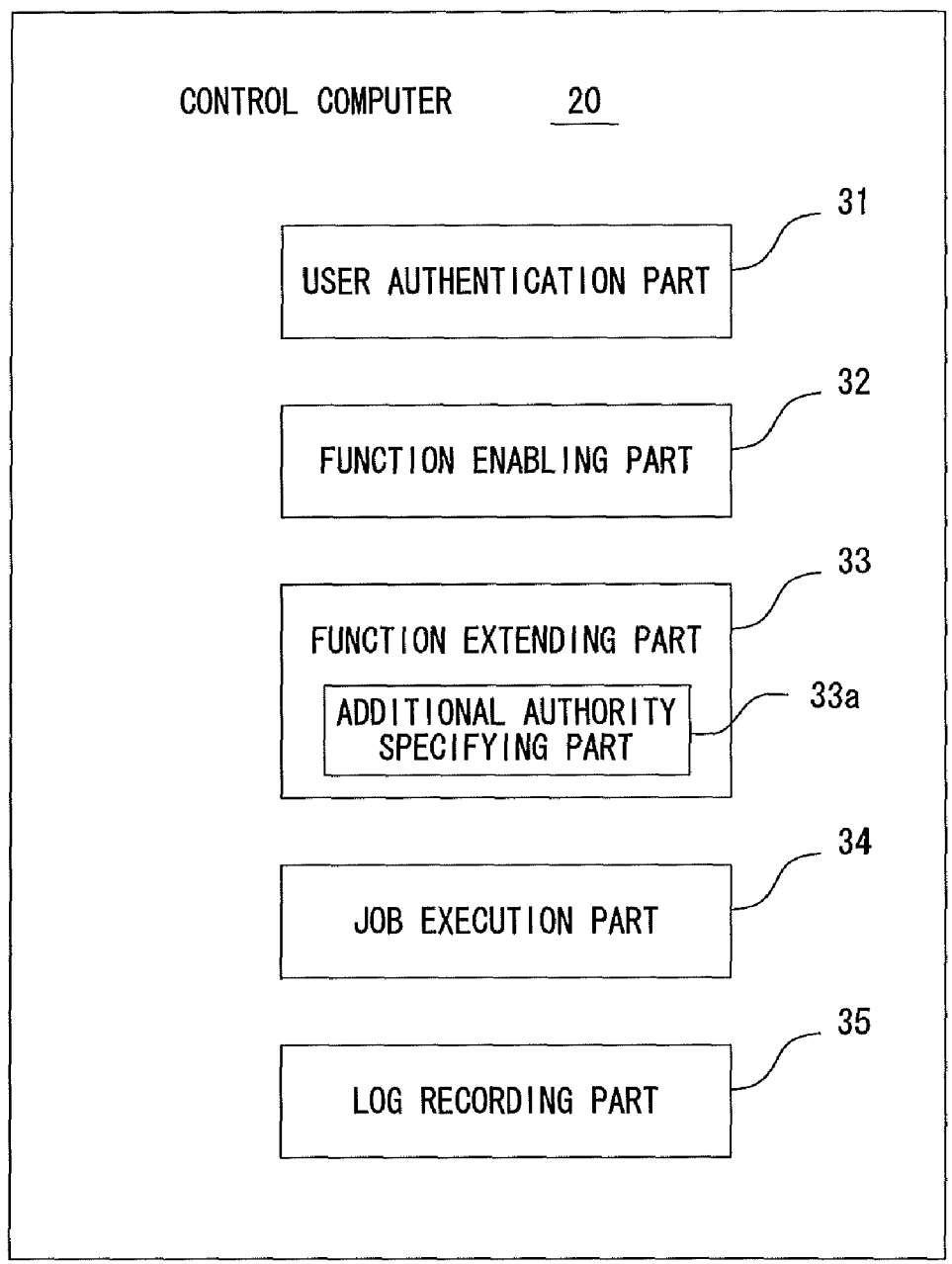
FIG. 4 shows an exemplary functional configuration realized by executing a program by a control computer of the image forming apparatus.

FIG. 4 shows an exemplary functional configuration realized by executing the program 27 by the control computer 20. As shown in FIG. 4, the control computer 20 functions as a user authentication part 31, a function enabling part 32, a function extending part 33, a job execution part 34 and a log recording part 35.

The user authentication part 31 comes into operation to function in response to a detection of user's operation of authentication key 6c. The user authentication part 31 outputs read instructions to the authentication information reader 8, responding to the instruction, the authentication information reader 8 reads authentication information. The user authentication part 31 then acquires the read authentication information from the authentication information reader 8. The user authentication part 31 executes user authentication based on the acquired authentication information by establishing data communication with the authentication server 12.

The function enabling part 32 comes into operation to function when user authentication executed by the user authentication part 31 results in success while no user is logging into the image forming apparatus 1. The function enabling part 32 makes the image forming apparatus 1 to transit to a logged-in state in which the authenticated user is logging when user authentication executed by the user authentication part 31 results in success. That is, the function enabling part 32 enables at least one function of the image forming apparatus 1 based on authority set in advance for the authenticated user, thereby making at least one function available for the authenticated user. It is assumed that the authenticated user is authorized to use color copy function. The function is enabled, and the authenticated user may make color copy. In contrast, it is assumed that the authenticated user is authorized to use copy function but unauthorized to use color copy function. The function is enabled, and the authenticated user may only make black copy (single color copy).

The function extending part 33 comes into operation to function when user authentication of another user executed by the user authentication part 31 results in success while a user is logging into the image forming apparatus 1. If, for example, the first user is logging into the image forming apparatus 1, the image forming apparatus 1 has enabled at least one function based on authority set in advance for the first user as a result of above-described processing performed by the function enabling part 32. When user authentication of the second user who is different from the first user being executed by the user authentication part 31 results in success under such conditions, the function extending part 33 adds authority set in advance for the second user in addition to the first user's authority. The function extending part 33 then additionally enables at least one function based on additional authority, thereby extending functions available for the first user in a state where the first user is logging in.

Moreover, the function extending part 33 serves as an additional authority specifying part 33a. When authority of the second user is to be added to one of the first user, the additional authority specifying part 33a specifies authority to be added corresponding to the status of the image forming apparatus 1 at the time of success in user authentication of the second user by the user authentication part 31. When specifying additional authority to the first user's authority, the additional authority specifying part 33a specifies additional authority to the first user's authority based on the additional authority specifying information 28 stored in the storage unit 26. The additional authority specifying information 28 stored in the storage unit 26 contains information which associates the status of the image forming apparatus 1 and additional authority with each other. The additional authority specifying information 28 is explained in detail below.

The function extending part 33 extends at least one function available for the first user as described above. As a result, the first user may use authority of the second user with remaining a logged-in state of the first user in the image forming apparatus 1. It is assumed that the first user is not authorized to use color copy function. While the first user is logging into the image forming apparatus 1, the image forming apparatus 1 executes additional user authentication of the second user who is authorized to use color copy function, thereby allowing the first user to make color copy temporarily with the second user's authority. For "Scan To process", it is assumed that a destination to which the first user would like to transmit is not included in registered destinations which can be addressed by the first user. Even in that case, the image forming apparatus 1 executes additional user authentication of the second user who has registered the destination to which the first user would like to transmit as one of registered destinations while the first user is logging into the image forming apparatus 1, thereby allowing the first user to scan to the destination to which the first user would like to transmit temporarily with the second user's authority.

The job execution part 34 comes into operation to function when operation of the start key 6d made by a user is detected. The job execution part 34 serves as operating controls of hardware sections such as the scanner unit 2, the printer unit 3, the network interface 23, the facsimile unit 25 based on settings made on the operational panel 4, and executes a job specified by the user. For copy job, for instance, the job execution part 34 controls of drives of the scanner unit 2 and the printer unit 3, thereby executing a job such as color copy or black copy specified by the user. For "Scan To process", the job execution part 34 controls the scanner unit 2 to acquire image data generated by reading document, and to transmit to at least one designated destination through the network interface 23 or the facsimile unit 25.

The log recording part 35 comes into operation to function when job is executed by the job execution part 34. The log recording part 35 generates log data indicating execution of a job, and records on the log data 29 in the storage unit 26. Every time a job is executed in the image forming apparatus 1, the log recording part 35 updates the log data 29 as described above. So, job execution history is recorded on the log data 29 stored in the storage unit 26 for each user. Log data generated by the log recording part 35 is also output to the authentication server 12.

The plurality of computers 11 connected to the network 10 are computers allocated to each user individually. The plurality of computers 11 may transmit print data to the image forming apparatus 1 through the network 10. Also, the image forming apparatus 1 may transmit such as image data generated by reading a document to at least one of the computers 11 designated as destination through the network 10.

The authentication server 12 connected to the network 10 executes authentication processing of a user who uses the image forming apparatus 1. In the first preferred embodiment, the image forming apparatus 1 and the authentication server 12 executes user authentication processing with establishing data communication with each other through the network 10. So, load for user authentication on the image forming apparatus 1 is able to be reduced.

Figure 5:
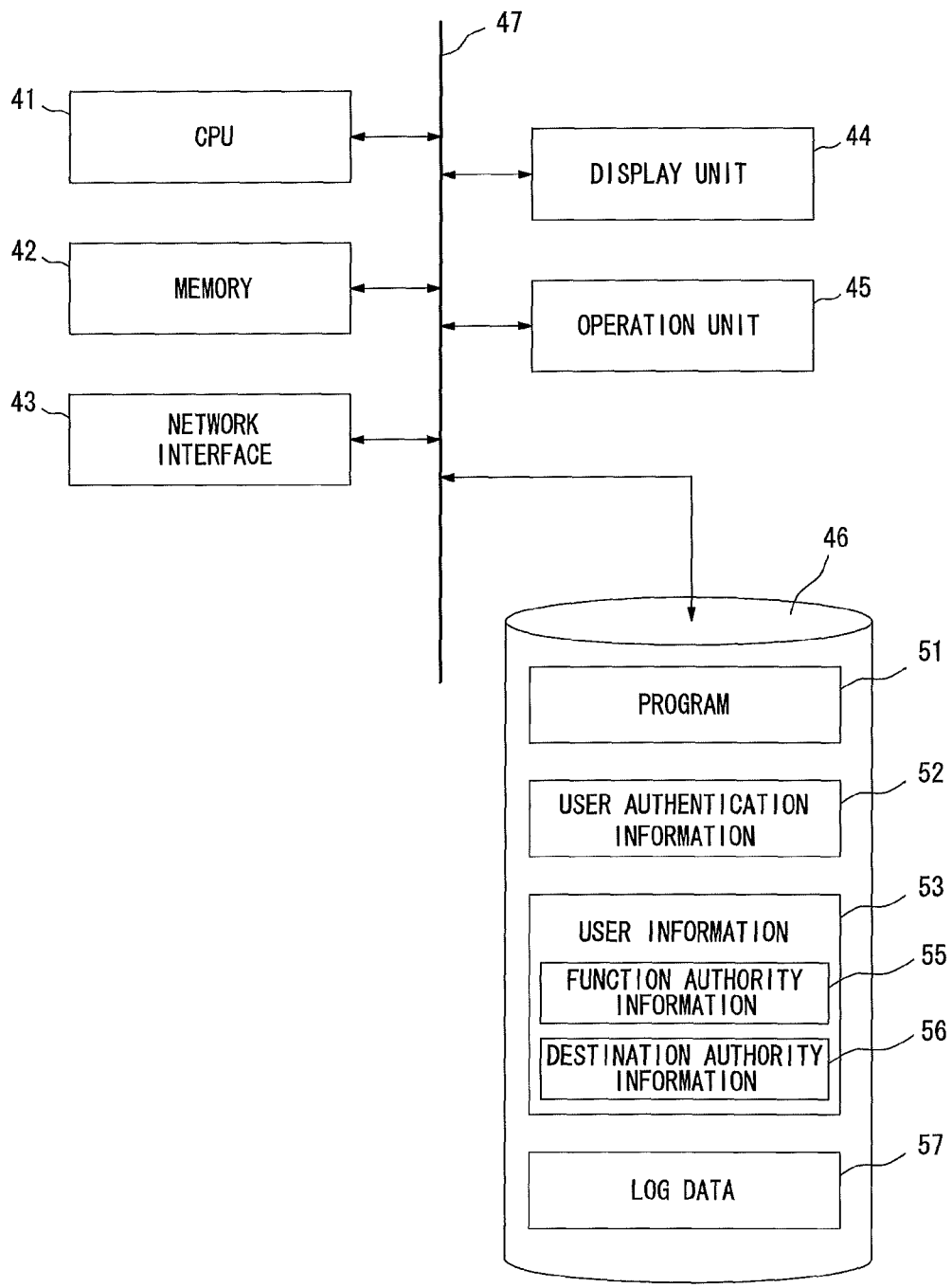
FIG. 5 is a block diagram showing the hardware configuration of the authentication server.

FIG. 5 is a block diagram showing the hardware configuration of the authentication server 12. The configuration of the authentication server 12 is the same as the one of general personal computers and the like. As illustrated in FIG. 5, the authentication server 12 includes as components of its hardware configuration a CPU 41, a memory 42, a network interface 43, a display unit 44, an operation unit 45 and a storage unit 46. These components are connected to each other through a data bus 47 in a manner that allows data input and output to and from each component. The CPU 41 reads a program 51 stored in the storage unit 46 and executes the read program 51, thereby serving as a processor that executes variety of processing described below. The memory 42 stores therein temporary data and the like used by the CPU 41 for executing variety of processing. The network interface 43 is for connecting the authentication server 12 to the network 10. Data communication with the image forming apparatus 1 is established through this network interface 43. The display unit 44 is, for instance, formed by a liquid crystal display, and the operation unit 45 is, for instance, formed by a keyboard or a mouse. The storage unit 46 is formed by a nonvolatile storage device such as a hard disk device, and a user authentication information 52, a user information 53 and a log data 57 and others are stored therein besides the above-described program 51.

By the CPU 41 reading the program 51 and executing the read program 51, the authentication server 12 refers to the user authentication information 52 stored in the storage unit 46 in response to a request from the image forming apparatus 1, thereby executing authentication processing. Moreover, the authentication server 12 refers to the user information 53 in response to a request from the image forming apparatus 1. The user information 53 is information relating to authority set in advance for each user who uses the image forming apparatus 1. As illustrated in FIG. 5, the user information 53 includes a function authority information 55 defining selectable functions for use of copy function or scan function and the like of the image forming apparatus 1 for each user, and a destination authority information 56 defining selectable destinations for scan transmission or facsimile transmission and others for each user. The log data 57 is the same data as the log data 29 stored in the image forming apparatus 1.

Figure 6:
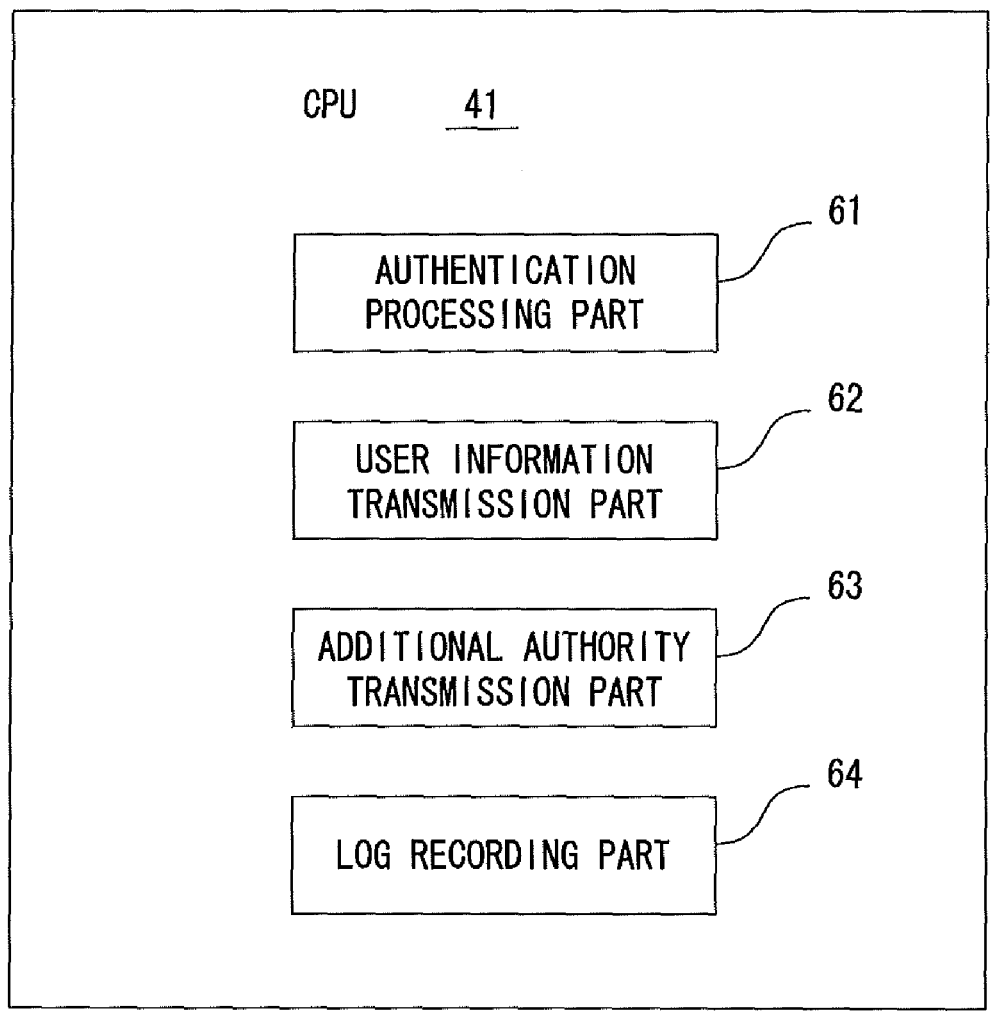
FIG. 6 shows an exemplary functional configuration realized by executing a program by a CPU of the authentication server.

FIG. 6 shows an exemplary functional configuration realized by executing the program 51 by the CPU 41. As shown in FIG. 6, the CPU 41 serves as an authentication processing part 61, a user information transmission part 62, an additional authority transmission part 63 and a log recording part 64.

The authentication processing part 61 comes into operation to function when receiving a request for authentication from the image forming apparatus 1. In response to the request, the authentication processing part 61 reads the user authentication information 52 stored in the storage unit 46, and executes user authentication processing. FIG. 7 is an example of the user authentication information 52. In the user authentication information 52, each user registered in advance and authentication information recorded in the authentication information recording medium 9 retained by the user are associated with each other. When receiving a request for authentication from the image forming apparatus 1, the authentication processing part 61 receives authentication information which the image forming apparatus 1 reads from the authentication information recording medium 9 together with the request. The authentication processing part 61 searches whether or not authentication information which matches with authentication information received from the image forming apparatus 1 is registered in the user authentication information 52, thereby executing authentication. If authentication information matches with the one received from the image forming apparatus 1 is registered in the user authentication information 52, a user is able to be identified, so user authentication processing results in success. In contrast, if authentication information matches with the one received from the image forming apparatus 1 is not registered in the user authentication information 52, a user is not able to be identified, so user authentication processing results in failure. The authentication processing part 61 then transmits the authentication result to the image forming apparatus 1.

The user information transmission part 62 comes into operation to function when receiving a request for transmission of user information from the image forming apparatus 1. Based on information identifying a user (for example, user name) contained in the request for user information, the user information transmission part 62 extracts user information responsive to the requested user from the user information 53.

FIG. 8 is an example of the user information 53 stored in the storage unit 46. As illustrated in FIG. 8, the user information 53 is composed of two or more information 53a, 53b and 53c defined for each user registered in advance. A user specifying information 54 in which user name and the like are defined, and the function authority information 55 and the destination authority information 56 set for the user are included in each user information 53a, 53b and 53c.

The user information 53a shown in FIG. 8 is exemplary information relating to "user A". In case of this example, with regard to copy, the "user A" is restricted to make color copy, so is not authorized to use color copy function. On the other hand, the "user A" is allowed to make copy onto A3 size sheets and regular sheets, and authorized to use those sheets. Moreover, with regard to scan, the "user A" is restricted to generate color data, so is not authorized to use function of reading a document in color. On the other hand, the "user A" is allowed to transmit data generated by scanning to transmit it via the network 10 by fax, so the "user A" is authorized to use these "Scan To" functions. Therefore, in the function authority information 55, if a user is authorized to use a function, "allow" is defined for an item responsive to the function. If a user is unauthorized to use a function, "restrict" is defined for an item responsive to the function.

Furthermore, as a case shown in FIG. 8, the "user A" may transmit data by e-mail, by fax and with FTP, and destinations that are selectable for data transmission are registered in advance corresponding to each function in the destination authority information 56.

Where the user information transmission part 62 extracts the user information 53a relating to the "user A" and transmits it to the image forming apparatus 1, for instance, the image forming apparatus 1 enables at least one function based on the user information 53a. In accordance with it, regarding to copy, other copy functions besides color copy become available in a state where the "user A" is logging in to the image forming apparatus 1. Regarding to scan, other scan functions besides function of reading a document in color become available. In addition, a function which allows the "user A" to select destination registered in the destination authority information 56 in advance with one-touch operation is enabled for data transmission such as "Scan To process".

Returning to FIG. 6, the additional authority transmission part 63 comes into operation to function when receiving a request for transmission of additional authority from the image forming apparatus 1. The additional authority transmission part 63 specifies user information responsive to the requested user from the user information 53 based on information identifying user (e.g. user name) included in the request for additional authority. The additional authority transmission part 63 then extracts information relating to authority specified as additional authority from the user information, and transmits the extracted information to the image forming apparatus 1. Thus, the image forming apparatus 1 is allowed to acquire information relating to additional authority from the authentication server 12, and to extend function.

The log recording part 64 comes into operation to function when the log recording part 64 receives log data from the image forming apparatus 1. Every time the log recording part 64 receives log data from the image forming apparatus 1, the log recording part 64 updates the log data 57 of each user stored in the storage unit 46. Therefore, job execution history is recorded also in the authentication server 12 for each user.

Figure 9:
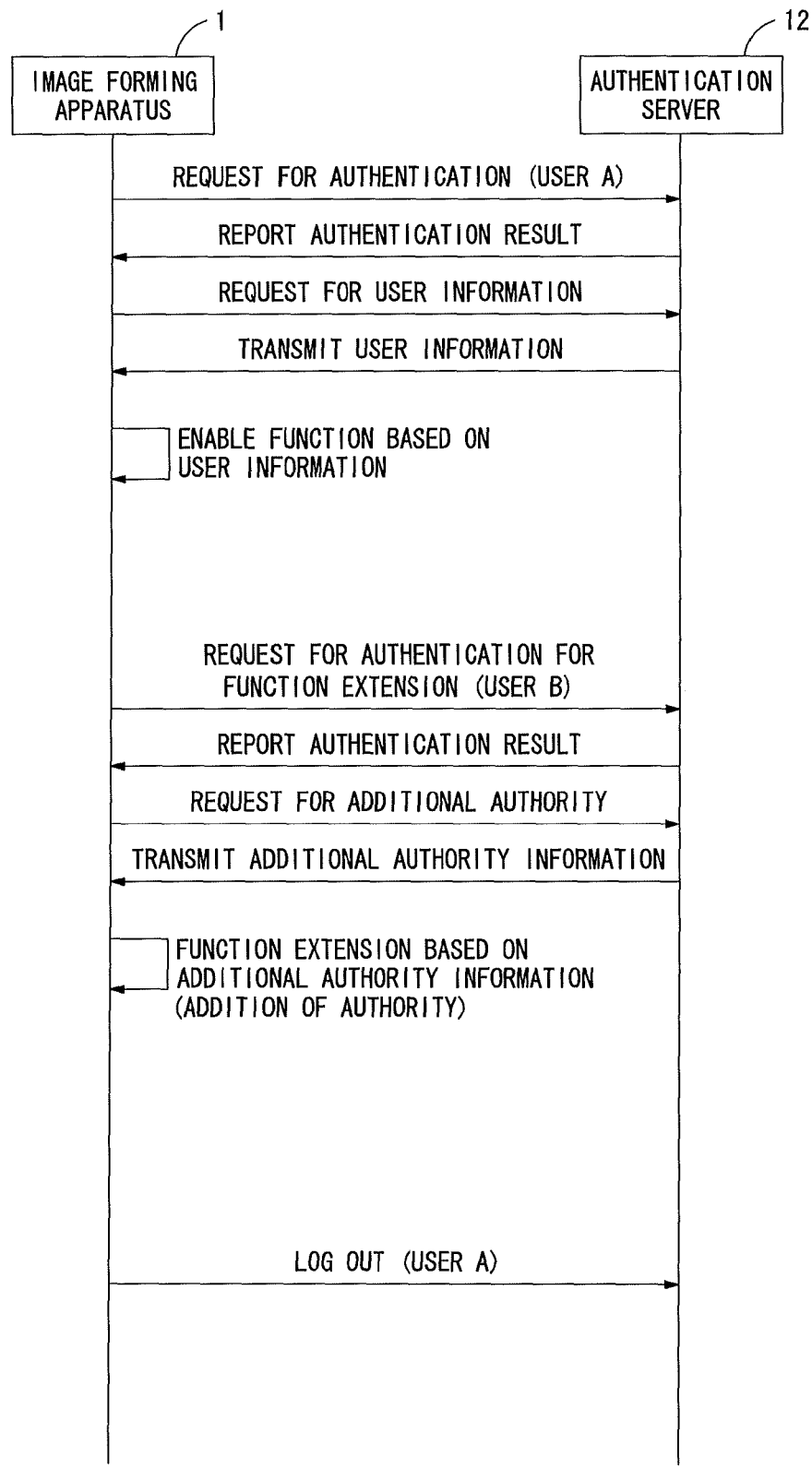
FIG. 9 conceptually shows data communication between the image forming apparatus and the authentication server.

Next, data communication between the image forming apparatus 1 and the authentication server 12 in case of executing function extension in the image forming apparatus 1 is explained. FIG. 9 conceptually shows data communication between the image forming apparatus 1 and the authentication server 12 according to the first preferred embodiment. It is assumed that the authentication key 6c is operated by user A while the image forming apparatus 1 is logged in by no user. In that case, the image forming apparatus 1 reads authentication information from the authentication information recording medium 9 retained by the user A, and gives a request for authentication to the authentication server 12. Here, the request for authentication transmitted from the image forming apparatus 1 to the authentication server 12 contains authentication information read from the authentication information recording medium 9 retained by the user A. When receiving authentication information of the user A together with the request for authentication from the image forming apparatus 1, the authentication server 12 refers to the user authentication information 52 to execute user authentication processing. If the authentication server 12 successfully specifies that authentication information read from the authentication information recording medium 9 is one of the user A, authentication results in success. The authentication server 12 then reports authentication result to the image forming apparatus 1. In this authentication result, information indicating that the authenticated user is the user A is included.

As receiving the authentication result from the authentication server 12, the image forming apparatus 1 is able to recognize that the authenticated user is the user A. The image forming apparatus 1 then transits to a logged-in state in which the user A is logging as a logged-in user. The image forming apparatus 1 gives a request for transmission of user information relating to the user A as a logged-in user to the authentication server 12. The authentication server 12 which receives the request for user information extracts the user information 53a relating to the user A from the user information 53 in the storage unit 46, and transmits to the image forming apparatus 1. As receiving the user information 53a from the authentication server 12, the image forming apparatus 1 is able to recognize authority registered in advance for the user A, so at least one function available for the user A is enabled based on the user information 53a. Thus, at least one function available for the user A is displayed on the display unit 5 of the operational panel 4 in a form being enabled, thereby allowing the user A to select and use the function. However, functions for which the user A is not authorized to use may not be selected and used by the user A in this state. As an example, color copy is not available for the user A in this state.

Where the user A would like to use color copy function, the user A asks user B who is authorized to use color copy function to perform additional user authentication, for example. That is, with remaining a logged-in state in which the user A is logging, the authentication key 6c for executing additional user authentication processing is operated in order to execute authentication of the user B. The image forming apparatus 1 then reads authentication information from the authentication information recording medium 9 retained by the user B, and gives a request for authentication for function extension to the authentication server 12. Here, the request for authentication for function extension transmitted from the image forming apparatus 1 to the authentication server 12 contains authentication information read from the authentication information recording medium 9 of the user B. As receiving authentication information of the user B together with the request for authentication for function extension from the image forming apparatus 1, the authentication server 12 refers to the user authentication information 52 to execute authentication processing. If the authentication server 12 may specify that authentication information received from the image forming apparatus 1 is one of the user B registered in the user authentication information 52 in advance, so authentication results in success. The authentication server 12 reports an authentication result to the image forming apparatus 1. In this authentication result, information indicating that the authenticated user is the user B is included.

As receiving the authentication result from the authentication server 12, the image forming apparatus 1 is able to recognize that the additionally authenticated user is the user B. So, the image forming apparatus 1 identifies the user B as an authority lending user. At least one function not available for the user A who is a logged-in user is determined based on the present status of the image forming apparatus 1, and authority corresponding to the function is specified as additional authority. The image forming apparatus 1 then gives a request for transmission of information responsive to the specified additional authority of authority set in advance for the user B as an authority lending user. When receiving the request, the authentication server 12 extracts the user information 53b relating to the user B from the user information 53 in the in the storage unit 46, and checks whether or not the user B has additional authority for the user A's authority. If the user B has additional authority, additional authority information responsive to the additional authority is transmitted to the image forming apparatus 1.

The image forming apparatus 1 which receives the additional authority information from the authentication server 12 determines whether or not the user B's authority may be added to the user A's authority. If it may be added, the user B's authority is added to the user A's authority based on the additional authority information, and at least one function available for the user A is extended. Thus, at least one function available for the user A is displayed on the display unit 5 of the operational panel 4 in a form being enabled based on the user B's authority, and the user A may select and use the function extended with the user B's authority. So, the user A cannot use color copy function, or the like soon after he or she logs into the image forming apparatus 1. However, he or she asks the user B to perform additional authentication after that, functions such as color copy become available with the user B's authority. After making the image forming apparatus 1 execute a desired job, the user A performs a log-out operation to complete the processing. When the user A logs out the image forming apparatus 1, the information is transmitted to the authentication server 12.

Figure 10:
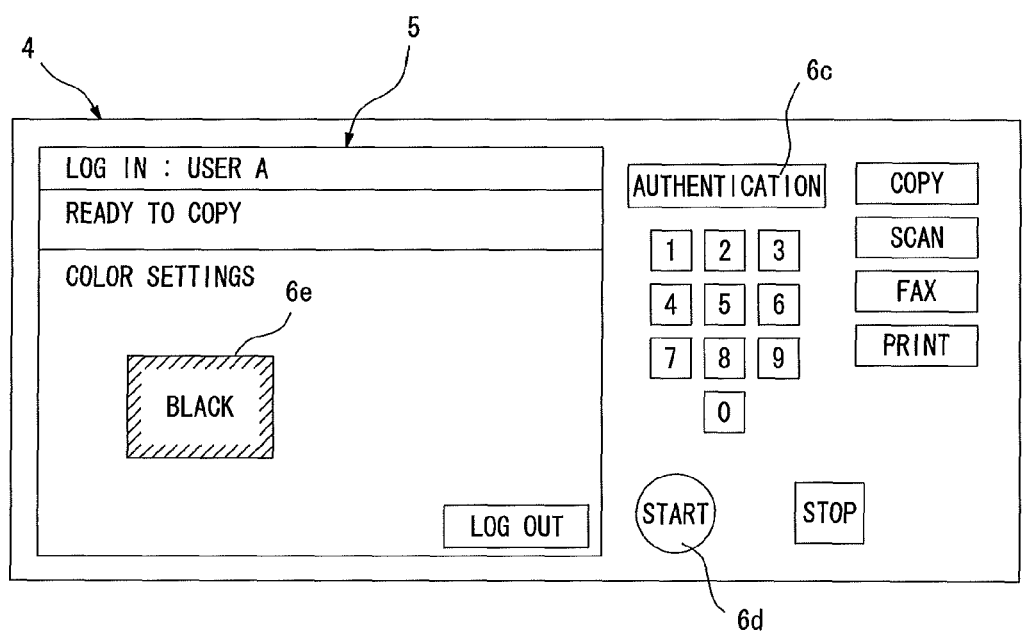
FIG. 10 shows an example of a display screen displayed on the operational panel before functions relating to copy is extended.
Figure 11:
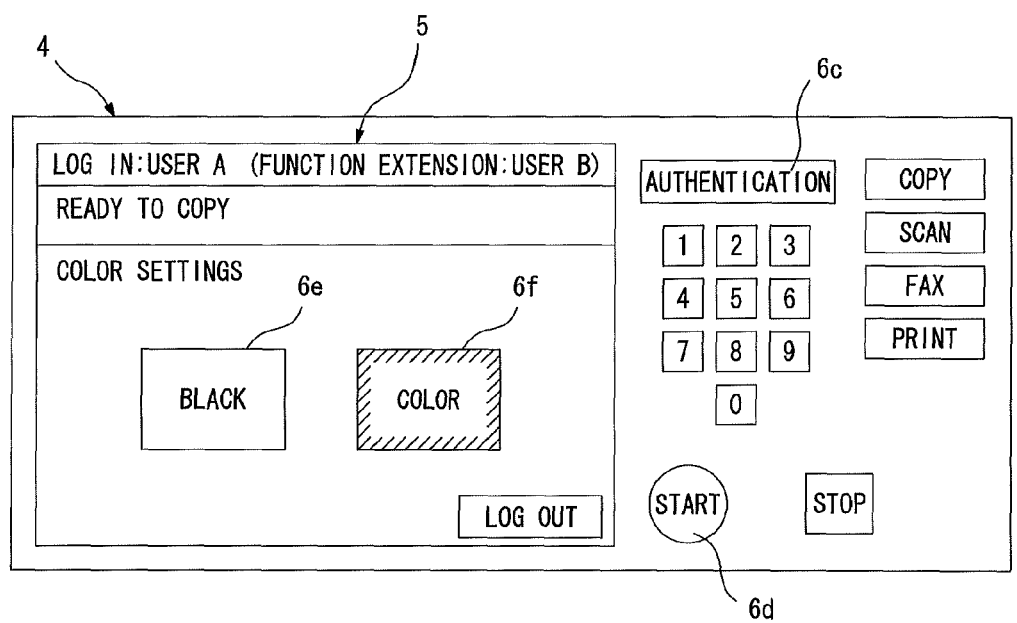
FIG. 11 is an example of a display screen displayed on the operational panel after functions relating to copy is extended.

Function extension in the image forming apparatus 1 as described is executed corresponding to the status of the image forming apparatus 1. By the way of example, when function extension is executed while the user A is making a setting operation relating to copy with logging into the image forming apparatus 1, at least one function relating to copy is extended. FIG. 10 and FIG. 11 show exemplary change of a display screen of the operational panel 4 at the time of extending functions relating to copy. FIG. 10 illustrates a display screen displayed before the function extension, and FIG. 11 illustrates a display screen displayed after the function extension. At first, as shown in FIG. 10, only a black button 6e is shown to be selectable on a color setting screen for copy function while the user A is logging into the image forming apparatus 1. At this time, other color settings are not selectable. When executing additional user authentication of the user B by the operation of the authentication key 6c under this condition, the image forming apparatus 1 executes function extension by using the user B's authority with remaining the logged-in state of the user A. If the user B is authorized to use color copy function, the display screen changes to the screen as shown in FIG. 11. After the function extension, both of the black button 6e and a color button 6f are shown to be selectable on the color setting screen for copy function as illustrated in FIG. 11. Therefore, the user A who is a logged-in user may make an operation of the color button 6f to select color copy after the function extension.

Figure 12:
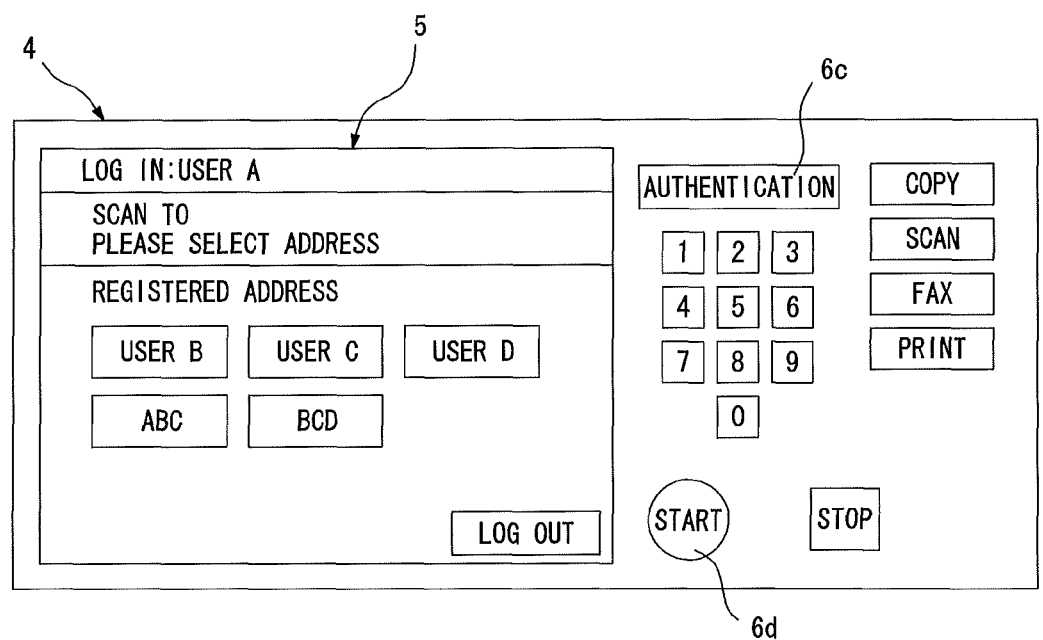
FIG. 12 is an exemplary change of destination selection screen displayed on the operational panel before functions relating to destination is extended.
Figure 13:
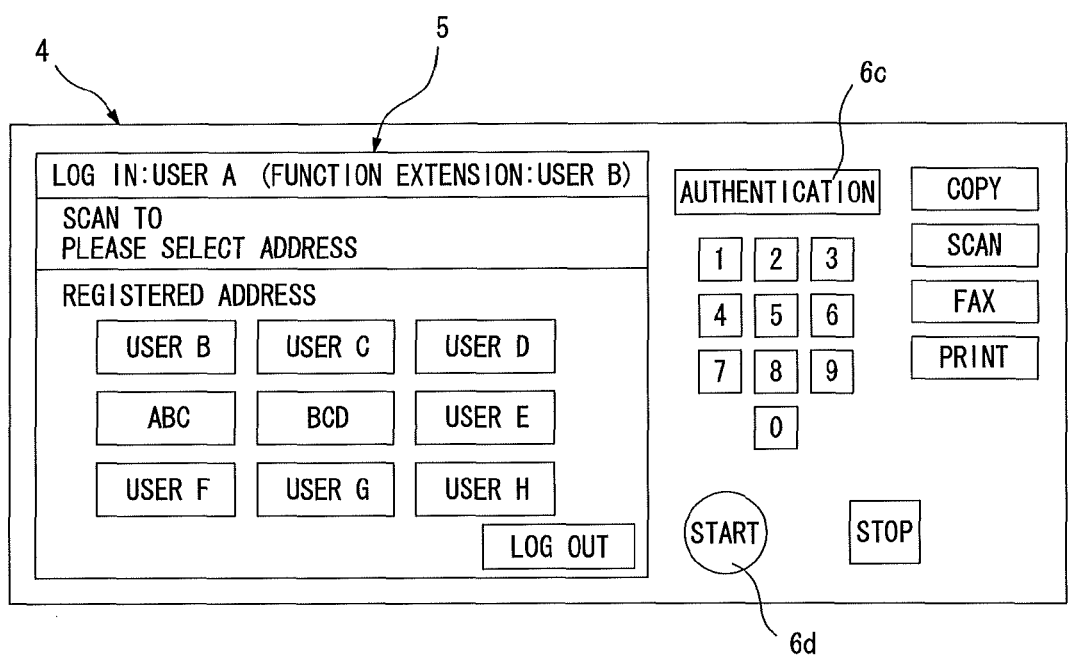
FIG. 13 is an exemplary change of destination selection screen displayed on the operational panel after functions relating to destination is extended.

Furthermore, in case of executing function extension while the user A is making an operation of selecting destination for "Scan To process" with logging into the image forming apparatus 1, functions relating to selecting destination to which the user A is able to transmit with one-touch operation are extended. FIG. 12 and FIG. 13 show exemplary change of destination selection screen displayed on the operational panel 4 when functions relating to destination are extended. FIG. 12 illustrates a display screen displayed before the function extension, and FIG. 13 illustrates a display screen displayed after the function extension. As shown in FIG. 12, while the user A is logging into the image forming apparatus 1, five destinations which are "user B", "user C", "user D", "ABC" and "BCD" are selectable for the user A with one-touch operation. At this time, other destinations besides those destinations are not selectable. When executing additional user authentication of the user B by the operation of the authentication key 6c under this condition with remaining the logged-in state of the user A, the image forming apparatus 1 executes function extension by using the user B's authority. If the user B is authorized to transmit to destinations other than above-described five destinations, the display screen changes to the screen as shown in FIG. 13. After the function extension, "user E", "user F", "user G" and "user H" are displayed in addition to above-described five destinations. Therefore, after the function extension, the user A who is a logged-in user may select destinations for "Scan To process" from "user E", "user F", "user G" and "user H" with one-touch operation.

Figure 14:
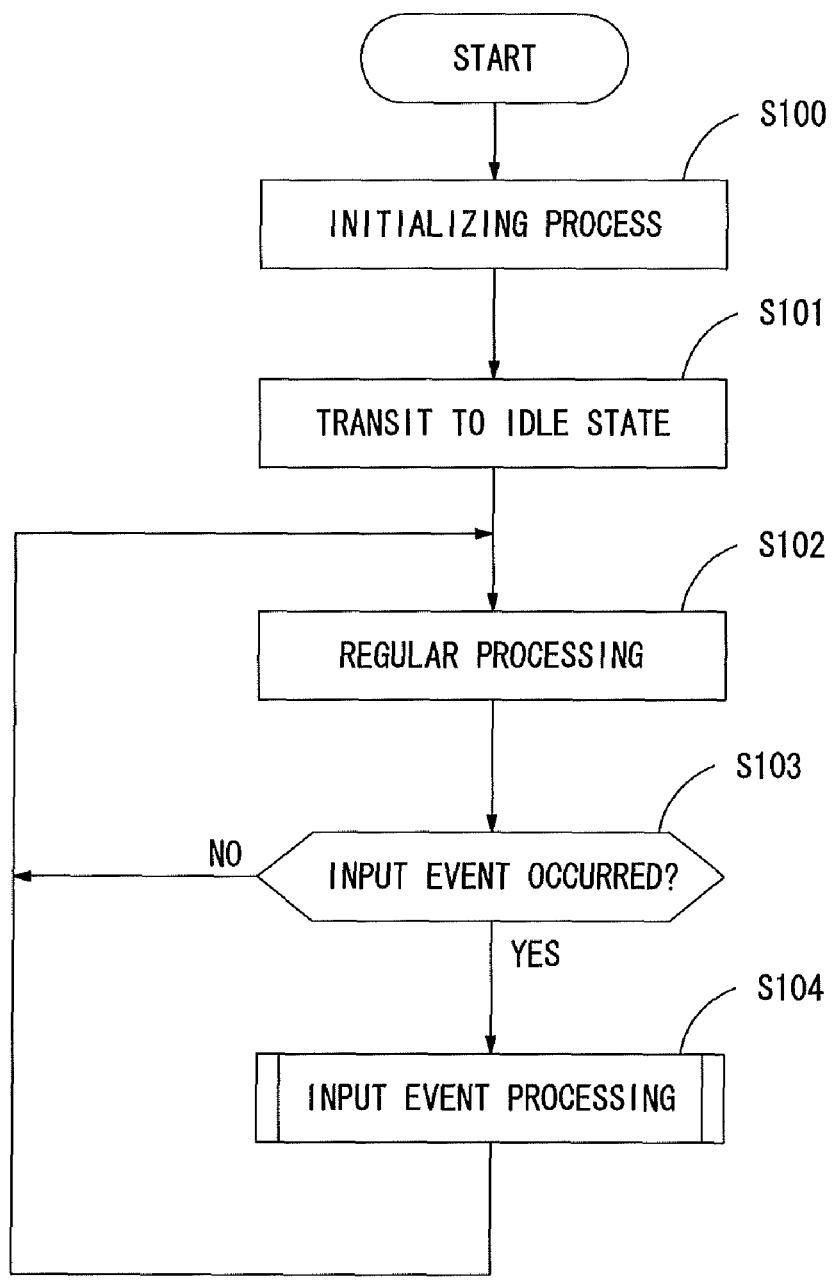
FIG. 14 is a flow diagram for explaining main routine of the process related to the basic operation of the image forming apparatus.

Next, operation of the image forming apparatus 1 is explained. FIG. 14 is a flow diagram for explaining main routine of the process sequence related to the basic operation of the image forming apparatus 1. This processing is performed by automatically reading the program 27 and executing the read program 27 by the CPU 21 of the control computer 20 after the image forming apparatus 1 is powered on. As this processing starts, the control computer 20 executes initializing process of various types of data, or the like (step S100). After the initializing process, the image forming apparatus 1 is transited to the idle state (step S101). As transiting to the idle state, the image forming apparatus 1 is put into a standby state for input. The control computer 20 then executes regular processing (step S102). In this regular processing, for example, after the elapse of the predetermined time since the last input operation, the image forming apparatus 1 is put into a power saving mode, or the like. The control computer 20 determines whether or not input event is occurred (step S103). The input event includes input operation made through the operation unit 6 of the operational panel 4. If input event is not occurred (when a result of step S103 is NO), the control computer 20 returns to the regular processing. If input event is occurred (when a result of step S103 is YES), the control computer 20 executes input event processing (step S104).

Figure 15:
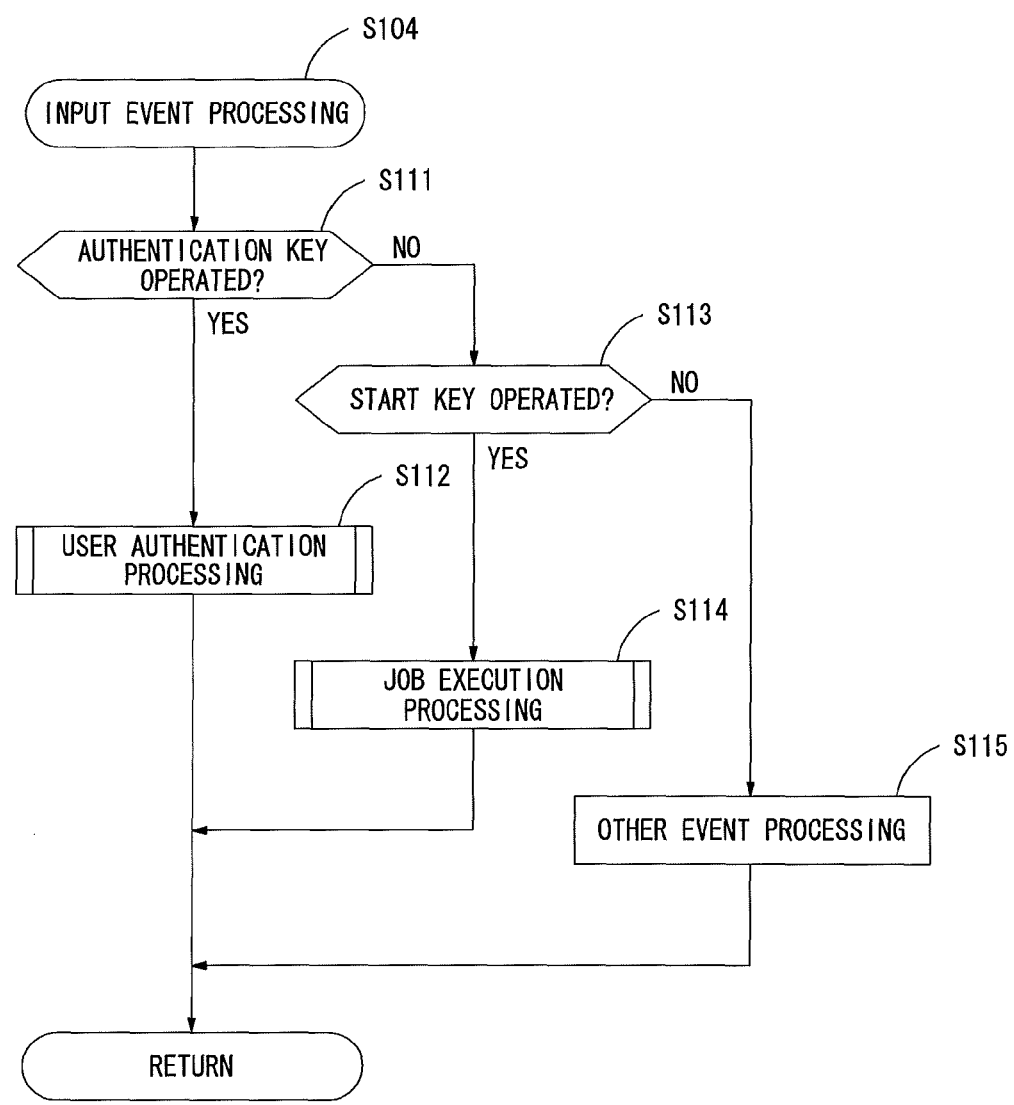
FIG. 15 is a flow diagram for explaining an exemplary detailed process sequence of input event processing in the image forming apparatus.

FIG. 15 is a flow diagram for explaining an exemplary detailed process sequence of the input event processing (step S104) in the image forming apparatus 1. When input event is occurred, the control computer 20 determines whether or not the authentication key 6c is operated (step S111). If the authentication key 6c is operated (when a result of step S111 is YES), the control computer 20 executes user authentication processing (step S112). If the authentication key 6c is not operated (when a result of step S111 is NO), the control computer 20 determined whether or not the start key 6d is operated (step S113). If the start key 6d is operated (when a result of step S113 is YES), the control computer 20 executes job execution processing (step S114). In contrast, if the start key is not operated either (when a result of step S113 is NO), the control computer 20 executes other event processing (step S115) responsive to the input event occurred in the image forming apparatus 1.

Figure 16:
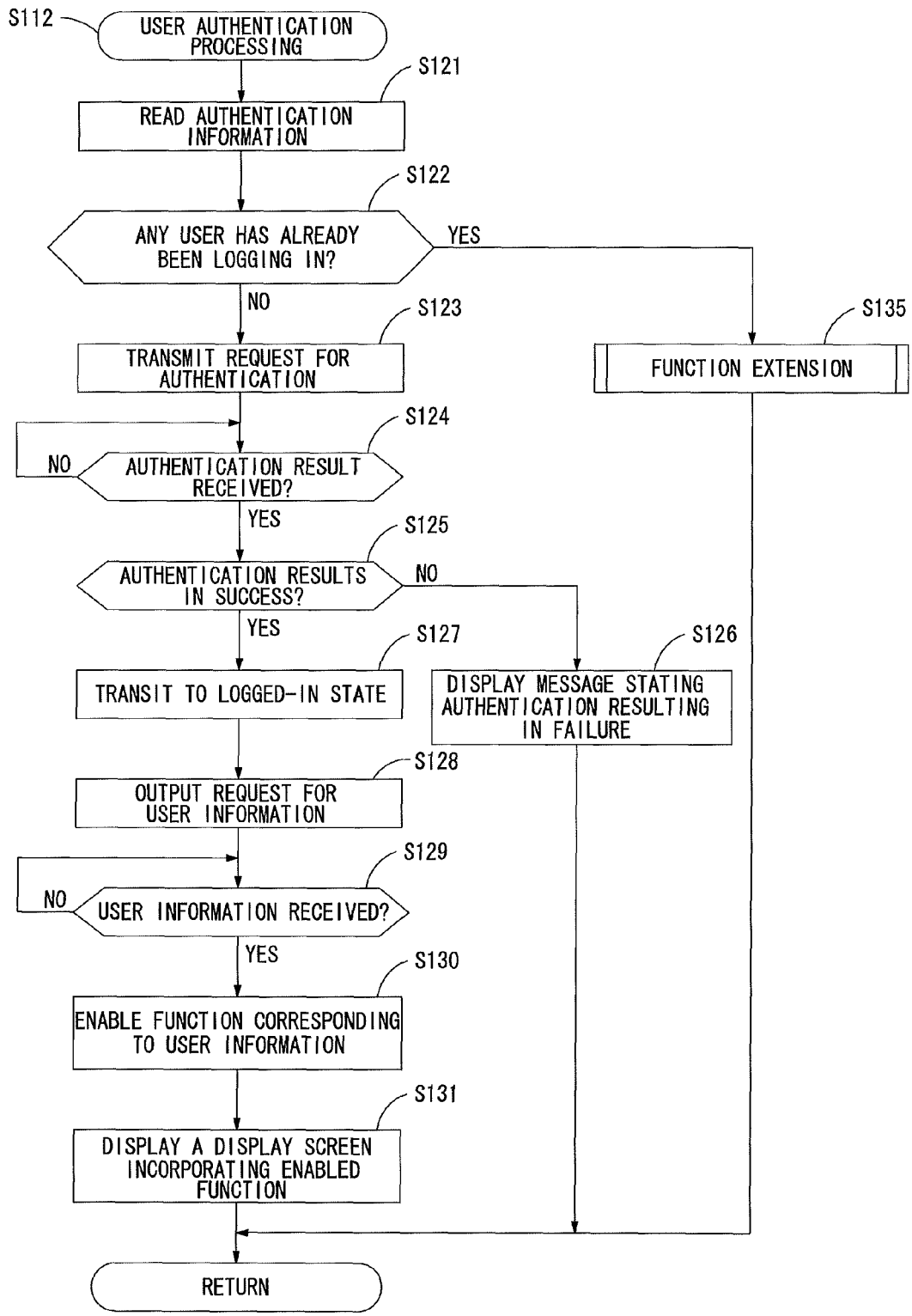
FIG. 16 is a flow diagram for explaining an exemplary detailed process sequence of user authentication processing in the image forming apparatus.

FIG. 16 is a flow diagram for explaining an exemplary detailed process sequence of the user authentication processing (step S112) in the image forming apparatus 1. When the authentication key 6c is operated, the control computer 20 comes into operation to function as the user authentication part 31 at first to read authentication information (step S121). Here, the control computer 20 outputs read instructions to the authentication information reader 8, thereby acquiring authentication information read by the authentication information reader 8 from the authentication information recording medium 9. The control computer 20 then determines whether or not the image forming apparatus 1 has already been logged in by any user (step S122).

When the image forming apparatus 1 is logged in by no user (when a result of step S122 is NO), the control computer 20 transmits a request for authentication to the authentication server 12 (step S123). At this time, authentication information read by the authentication information reader 8 is transmitted together with the request. The control computer 20 is in a resident state until receiving authentication result from the authentication server 12 (step S124). When receiving the authentication result, the control computer 20 determines whether or not user authentication results in success (step S125). If user authentication results in failure (when a result of step S125 is NO), a message stating that user authentication resulting in failure is displayed on the display unit 5 of the operational panel 4 (step S126), and user authentication processing completes. If user authentication results in success (when a result of step S125 is YES), the control computer 20 identifies authenticated user, and makes the image forming apparatus 1 to transit to a logged-in state in which the authenticated user is logging (step S127). The authenticated user is then becomes a logged-in user of the image forming apparatus 1.

The control computer 20 transmits a request for transmission of user information relating to the logged-in user to the authentication server 12 (step S128). The control computer 20 is in a resident state until receiving user information from the authentication server 12 (step S129). When user information is received, at least one function corresponding to the authority set for the logged-in user which is included in the user information is enabled (step S130). The control computer 20 creates a display screen incorporating at least one function enabled corresponding to authority of the logged-in user, and displays on the display unit 5 of the operational panel 4 (step S131). Therefore, the logged-in user may use at least one enabled function based on his or her own authority.

In contrast, when any user has already been logging into the image forming apparatus 1 at the time of the execution of reading of authentication information (when a result of step S122 is YES), this user authentication processing becomes processing for extending function which can be used by the logged-in user. So, the control computer 20 executes function extension (step S135).

Figure 17:
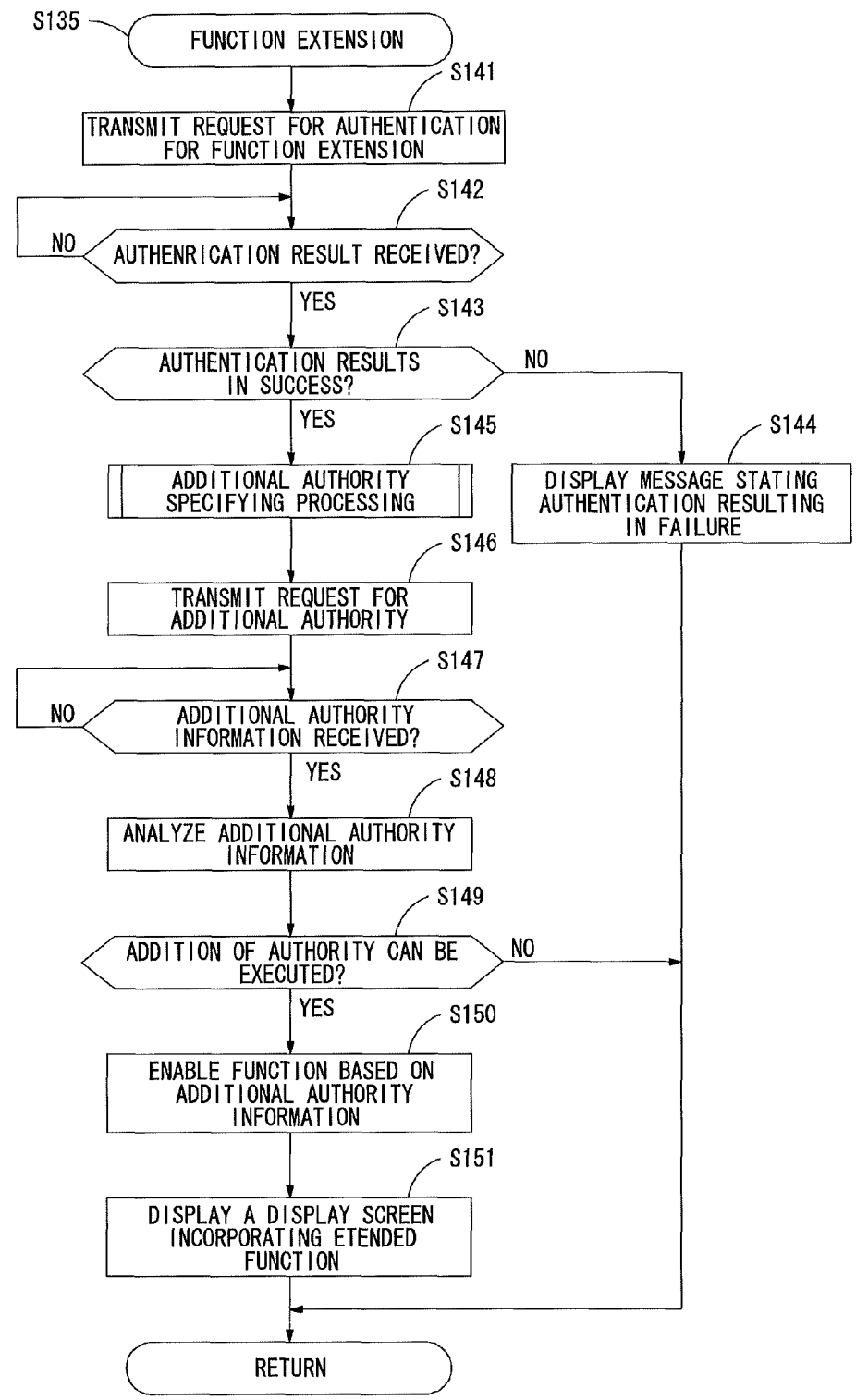
FIG. 17 is a flow diagram for explaining an exemplary detailed process sequence of function extension in the image forming apparatus.

FIG. 17 is a flow diagram for explaining an exemplary detailed process sequence of the function extension (step S135) in the image forming apparatus 1. As moving on to the function extension, the control computer 20 transmits a request for authentication for function extension to the authentication server 12 (step S141). Here, the control computer 20 transmits authentication information read by the authentication information reader 8 together with the request. The control computer 20 is in a resident state until receiving authentication result from the authentication server 12 (step S142), and when receiving the authentication result, the control computer 20 determines whether or not user authentication results in success (step S143). If user authentication results in failure (when a result of step S143 is NO), a message stating that user authentication resulting in failure is displayed on the display unit 5 of the operational panel 4 (step S144), and function extension (user authentication processing) completes. If user authentication results in success (when a result of step S143 is YES), the control computer 20 is able to identify the authenticated user as an authority lending user. The control computer 20 then executes additional authority specifying processing (step S145).

Figure 18:
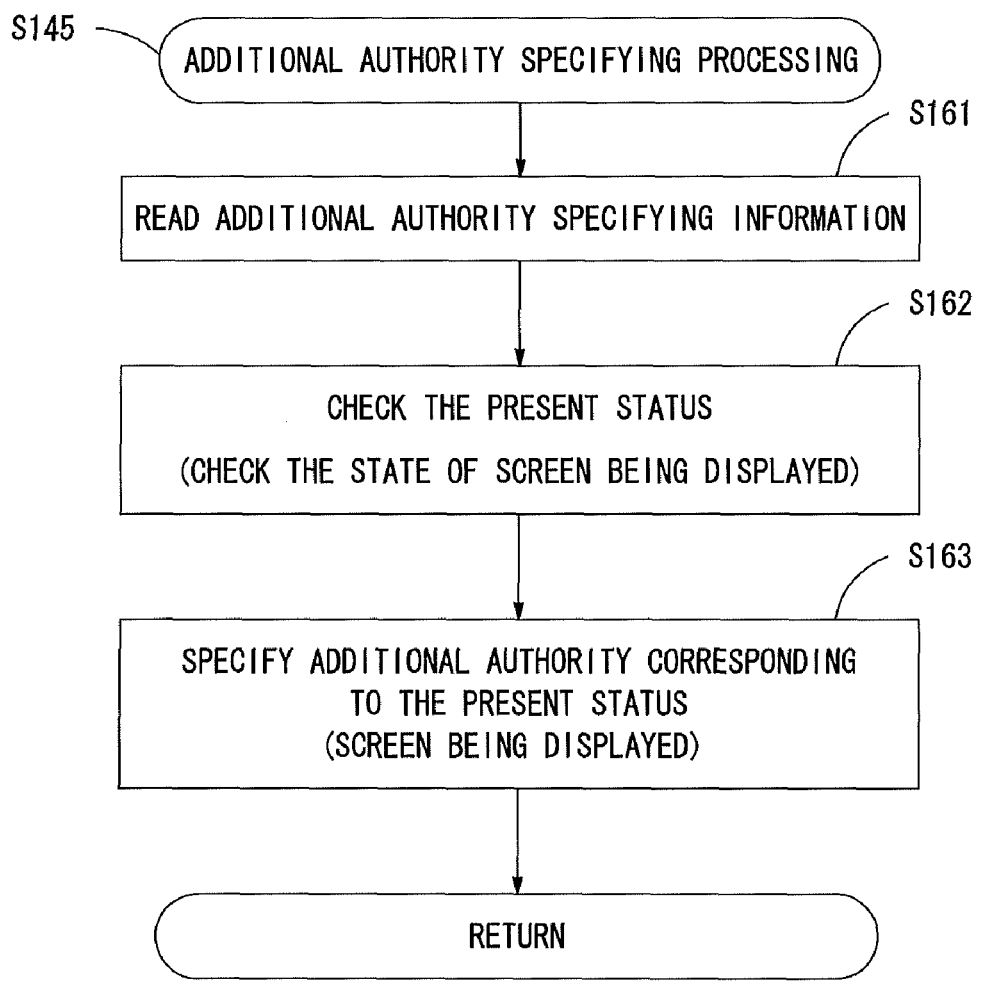
FIG. 18 is a flow diagram for explaining an exemplary detailed process sequence of additional authority specifying processing in the image forming apparatus.

FIG. 18 is a flow diagram for explaining an exemplary detailed process sequence of the additional authority specifying processing (step S145) in the image forming apparatus 1. The control computer 20 reads the additional authority specifying information 28 from the storage unit 26 (step S161).

FIG. 19 is an example of the additional authority specifying information 28. The status of the image forming apparatus 1 and additional authority for authority of a logged-in user corresponding to the status are associated with each other in the additional authority specifying information 28. In the example of FIG. 19, the status of the image forming apparatus 1 is defined by associating a display screen displayed on the display unit 5 of the operational panel 4 and authority of a logged-in user in a state where the display screen is being displayed. The control computer 20 checks the present status of the image forming apparatus 1, and refers to the additional authority specifying information 28 based on the present status, thereby specifying additional authority corresponding to the present status of the image forming apparatus 1. Where, for example, a color setting screen as to copy as illustrated in FIG. 10 is displayed on the operational panel 4 of the image forming apparatus 1, color copy on the color setting screen is restricted as for the present status. So, additional authority to allow color copy on the color setting screen may be specified by referring to the additional authority specifying information 28. Also, where a destination selection screen as illustrated in FIG. 12 is displayed on the operational panel 4 of the image fanning apparatus 1, only destinations registered for the logged-in user are selectable on the destination selection screen as for the present status. So, additional authority to make destinations registered for the authority lending user to be selectable may be specified by referring to the additional authority specifying information 28.

Therefore, after reading the additional authority specifying information 28 from the storage unit 26, the control computer 20 checks the present status of the image forming apparatus 1 (step S162), and refers to the additional authority specifying information 28 based on the present status of the image forming apparatus 1, thereby specifying additional authority corresponding to the present status of the image forming apparatus 1 (step S163).

Returning to FIG. 17, after additional authority is specified as described above, the control computer 20 gives a request for transmission of additional authority to the authentication server 12 (step S146). That is, the control computer 20 gives a request for transmission of information relating to additional authority of the authority lending user to the authentication server 12. After transmission of the request, the control computer 20 is put into a resident state until receiving additional authority information (step S147). As receiving the additional authority information, the control computer 20 analyzes the received additional authority information (step S148). Information regarding availability about lending authority of the authority lending user to the logged-in user is included in the additional authority information received from the authentication server 12. When the user B performs additional user authentication while user A is logging in, for instance, sometimes the user B does not have additional authority for the user A's authority. In such a case, the user B's authority is restricted to lend to the user A. So, the control computer 20 analyzes the additional authority information to determine whether or not authority of the authority lending user may be added to the one of the logged-in user (step S149). As a result, if authority of the authority lending user may not be added to the one of the logged-in user (when a result of step S149 is NO), the processing completes without execution of function extension. If authority of the authority lending user may be added to the one of the logged-in user (when a result of step S149 is YES), the control computer 20 enables a function based on the additional authority information (step S150). That is, at least one function is additionally enabled based on the authority of the authority lending user who has performed additional user authentication, and at least one function available for the logged-in user is extended. The display screen incorporates at least one extended function is displayed on the display unit 5, so the logged-in user can select the extended function (step S151). Function extension (step S135) and user authentication processing (step S112) are thus completed.

Where above-described user authentication processing is executed with no user logging into the image forming apparatus 1, the image forming apparatus 1 is put into a logged-in state in which the first user authenticated by the user authentication is logging as a logged-in user. Then, at least one function available for the logged-in user is enabled based on authority set in advance for the logged-in user. If any user has already been logging in, the second user who is additionally authenticated becomes an authority lending user. Authority set in advance for the authority lending user is added to authority of the logged-in user, and function available for the logged-in user may be expanded. After operation of various types of settings on the operational panel 4 made by the logged-in user, job execution processing (step S114 in FIG. 15) is executed in response to operation of the start key 6d.

Figure 20:
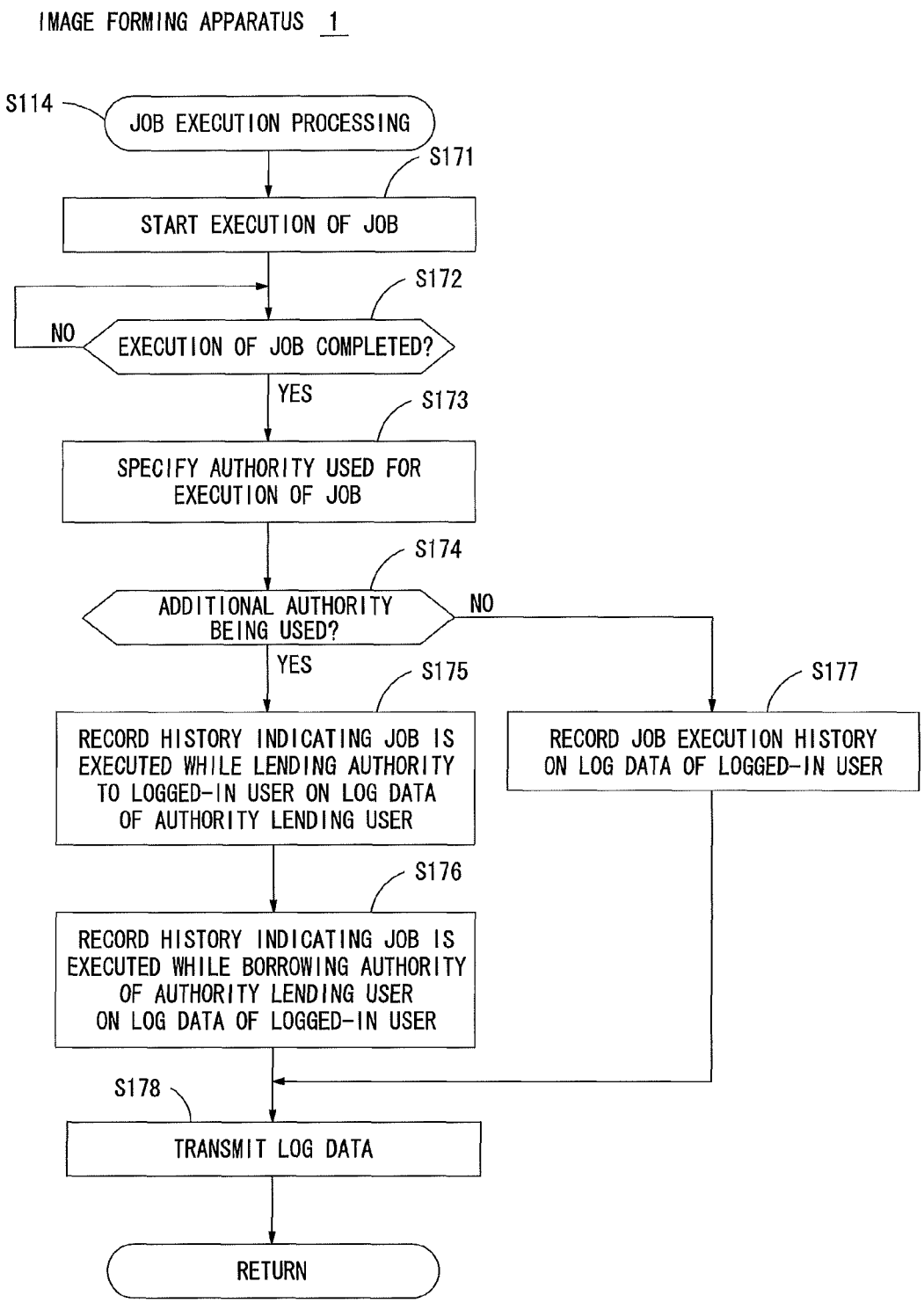
FIG. 20 is a flow diagram for explaining an exemplary detailed process sequence of job execution in the image forming apparatus.

FIG. 20 is a flow diagram for explaining an exemplary detailed process sequence of the job execution (step S114) in the image forming apparatus 1. When the start key 6d is operated, the control computer 20 starts execution of a job (step S171) incorporating a selected function, settings made by the logged-in user and the like. At this time, the control computer 20 controls the execution of the job specified by the logged-in user by driving hardware sections such as the scanner unit 2, the printer unit 3, the network interface 23 or the facsimile unit 25 as required. The control computer 20 continues controlling hardware sections until the execution of the job is completed (step S172). At the time of the completion of the execution of job, the control computer 20 moves on to processing for recording log which is recorded in accordance with execution of a job.

The control computer 20 specifies authority used for execution of a job (step S173), and determines whether or not authority added by the authority lending user and not authority of the logged-in user is used for the execution of the job (step S174). When the job is executed with authority added by the authority lending user (when a result of step S174 is YES), the control computer 20 generates log data indicating that the job is executed while the authority lending user is lending his or her authority to the logged-in user, and records the log data generated thereby on the log data 29 of the authority lending user stored in the storage unit 26 (step S175). The control computer 20 also generates log data indicating that the job is executed while the logged-in user is borrowing authority of the authority lending user, and records the log data generated thereby on the log data 29 of the logged-in user stored in the storage unit 26 (step S176). When the job is executed with additional authority, the image forming apparatus 1 of the first preferred embodiment records job execution history in which borrowing and lending relationship of authority is clearly specified on the log data 29 of both the logged-in user and the authority lending user.

When the job is executed with the logged-in user's own authority and not with additional authority (when a result of step S174 is NO), the control computer 20 generates log data indicating that the job is executed with the logged-in user's own authority, and records the log data generated thereby on the log data 29 of the logged-in user stored in the storage unit 26 (step S177).

The control computer 20 transmits log data generated in the step S175, the step S176 or the step S177 to the authentication server 12 (step S178), and completes the processing.

Figure 21:
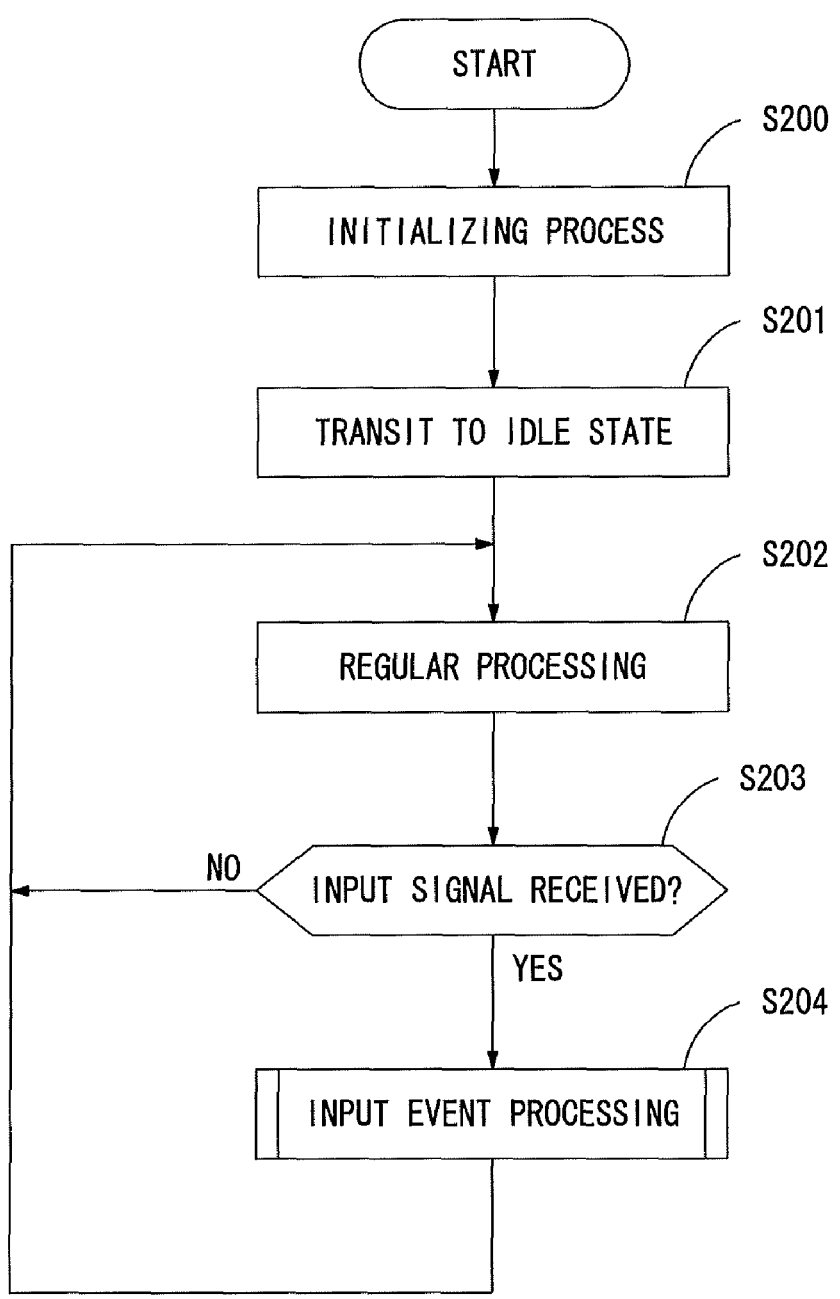
FIG. 21 is a flow diagram for explaining main routine of the process related to the basic operation of the authentication server.

Next, operation of the authentication server 12 is explained. FIG. 21 is a flow diagram for explaining main routine of the process sequence related to the basic operation of the authentication server 12. This processing is performed by automatically reading the program 51 and executing the read program 51 by the CPU 41 after the authentication server 12 is powered on. As the processing starts, the CPU 41 executes initializing process of various types of data, or the like (step S200). After the initializing process, the authentication server 12 is transited to the idle state (step S201). The authentication server 12 transited to the idle state is, for example, in a standby state for input signal from the network 10. The CPU 41 then executes regular processing (step S202). In this regular processing, for example, after the elapse of the predetermined time since execution of the processing based on the last input signal, the authentication server 12 is put into a power saving mode, or the like. The CPU 41 determines whether or not input signal is received (step S203). This input signal includes signals such as many kinds of requirements transmitted from the image forming apparatus 1. If input signal is not received (when a result of step S203 is NO), the CPU 41 returns to the regular processing. If input signal is received (when a result of step S203 is YES), the CPU executes input signal processing (step S204).

Figure 22:
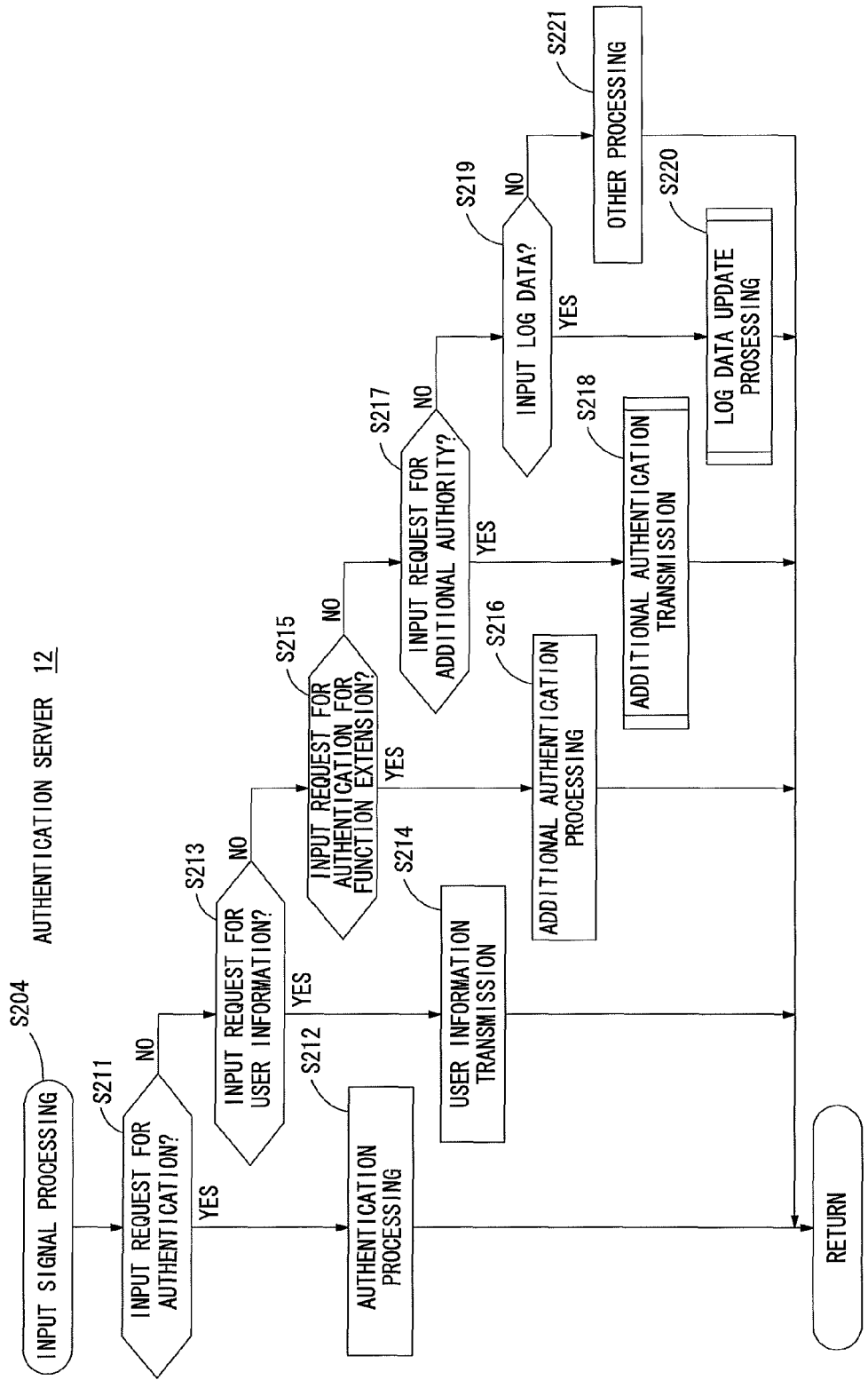
FIG. 22 is a flow diagram for explaining an exemplary detailed process sequence of input signal processing in the authentication server.

FIG. 22 is a flow diagram for explaining an exemplary detailed process sequence of input signal processing (step S204) in the authentication server 12. When receiving input signal, the CPU 41 of the authentication server 12 determines whether or not the received input signal is a request for authentication from the image forming apparatus 1 (step S211). If the input signal is a request for authentication (when a result of step S211 is YES), the CPU 41 executes authentication processing (step S212). That is, the CPU 41 reads the user authentication information 52 from the storage unit 46, and executes authentication processing based on authentication information received from the image forming apparatus 1 together with the request for authentication. If a user who has the same authentication information as the one received from the image forming apparatus 1 may be identified from users registered in the user authentication information 52, the result as authentication results in success is transmitted to the image forming apparatus 1. If a user who has the same authentication information as the one received from the image forming apparatus 1 may not be identified from users registered in the user authentication information 52, the result as authentication resulting in failure is transmitted to the image forming apparatus 1.

If the received input signal is not a request for authentication (when a result of step S211 is NO), the CPU 41 determines whether or not the received input signal is a request for transmission of user information from the image forming apparatus 1 (step S213). If the received input signal is a request for transmission of user information (when a result of step S213 is YES), the CPU 41 executes user information transmission (step S214). So, the CPU 41 reads the user information 53 from the storage unit 46, and extracts user information of the identified user based on information identifies the user received with the request for user information from the image forming apparatus 1, thereby transmitting to the image forming apparatus 1.

If the received input signal is not even a request for transmission of user information (when a result of step S213 is NO), the CPU 41 determines whether or not the received input signal is a request for authentication for function extension from the image forming apparatus 1 (step S215). If the received input signal is a request for authentication for function extension (when a result of step S215 is YES), the CPU 41 executes additional authentication processing for addition of authority (step S216) which is almost the same processing as the authentication processing in step S212 described above. The CPU 41 reads the user authentication information 52 from the storage unit 46, and executes authentication processing based on authentication information received with the request for authentication for function extension from the image forming apparatus 1. If a user who has the same authentication information as the one received from the image forming apparatus 1 is able to be identified from users registered in the user authentication information 52, the result as authentication resulting in success is transmitted to the image forming apparatus 1. If a user who has the same authentication information as the one received from the image forming apparatus 1 is not able to be identified from users registered in the user authentication information 52, the result as authentication resulting in failure is transmitted to the image forming apparatus 1.

If the received input signal is not even a request for authentication for function extension (when a result of step S215 is NO), the CPU 41 determines whether or not the received input signal is a request for transmission of additional authority from the image forming apparatus 1 (step S217). If the received input signal is a request for transmission of additional authority (when a result of step S217 is YES), the CPU 41 executes additional authority transmission (step S218).

Figure 23:
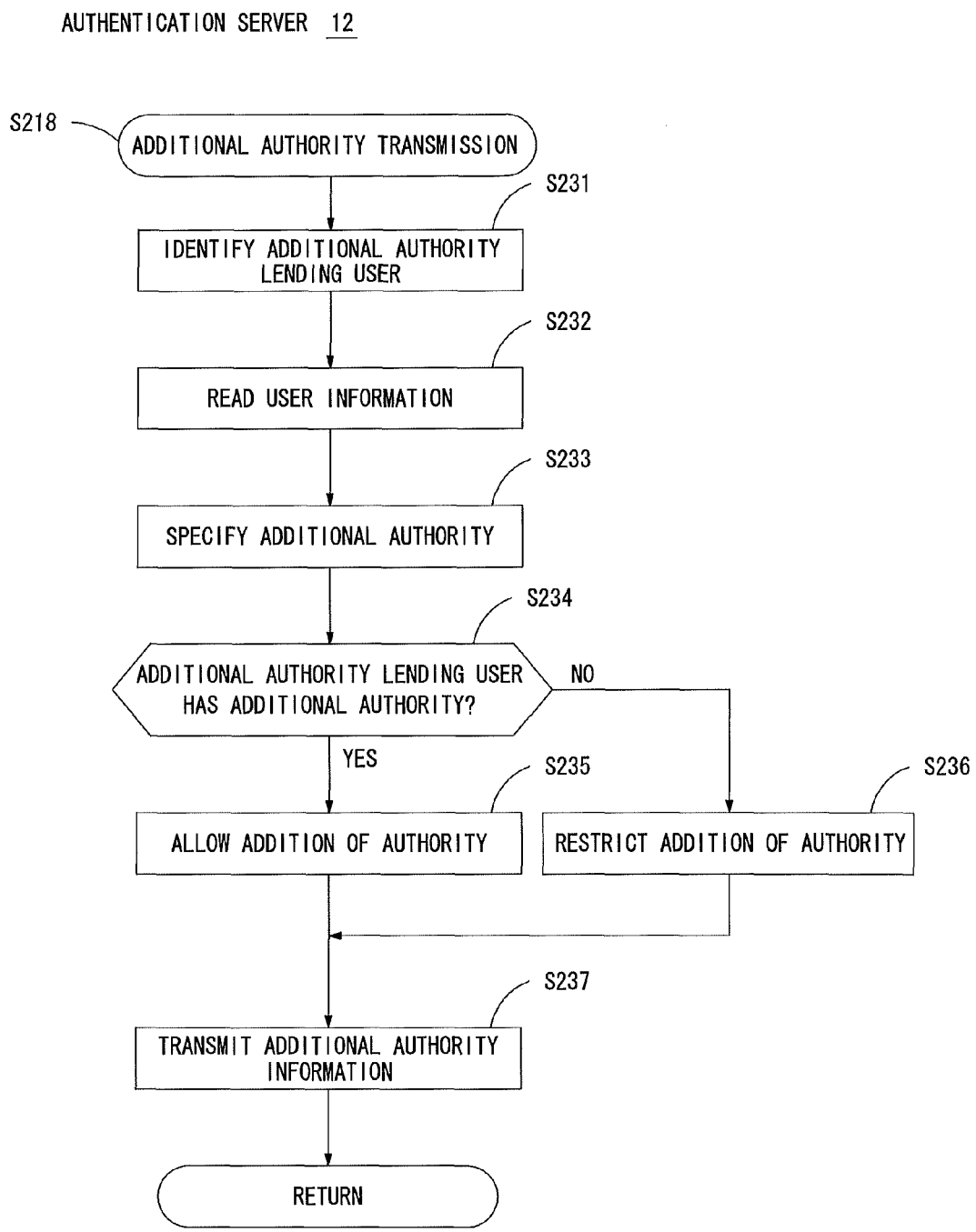
FIG. 23 is a flow diagram for explaining an exemplary detailed process sequence of additional authority transmission in the authentication server.

FIG. 23 is a flow diagram for explaining an exemplary detailed process sequence of the additional authority transmission (step S218) in the authentication server 12. As receiving a request for transmission of additional authority, the CPU 41 identifies an authority lending user based on information included in the request (step S231), and reads user information of the authority lending user from the user information 53 stored in the storage unit 46 (step S232). The CPU 41 also specifies additional authority for authority of the logged-in user based on the request for additional authority (step S233), and determines whether or not the authority lending user has additional authority based on user information of the authority lending user (step S234). If the authority lending user has additional authority for the authority of the logged-in user (when a result of step S234 is YES), the CPU 41 allows addition of authority. When the authority lending user doesn't have additional authority for the authority of the logged-in user (when a result of step S234 is NO), the CPU 41 restricts addition of authority. The CPU 41 generates additional authority information corresponding to a result of processing executed in step S235 or step S236, and transmits to the image forming apparatus 1 (step S237). By way of example, when allowing addition of authority, the CPU 41 generates additional authority information including information indicating that addition of authority is allowed and information related to additional authority of the authority lending user, and transmits. When restricting addition of authority, the CPU 41 generates additional authority information including information indicating that addition of authority is restricted, and transmitted. So, when the authentication server 12 allows addition of authority, function extension is executed in the image forming apparatus 1. In contrast, when the authentication server 12 restricts addition of authority, function extension is not executed in the image forming apparatus 1.

Returning to FIG. 22, if input signal received from the authentication server 12 is not even a request for transmission of additional authority (when a result of step S217 is NO), the CPU 41 determines whether or not the received input signal is log data from the image forming apparatus 1 (step S219). If log data is received (when a result of step S219 is YES), the CPU 41 executes log data update processing (step S220).

Figure 24:
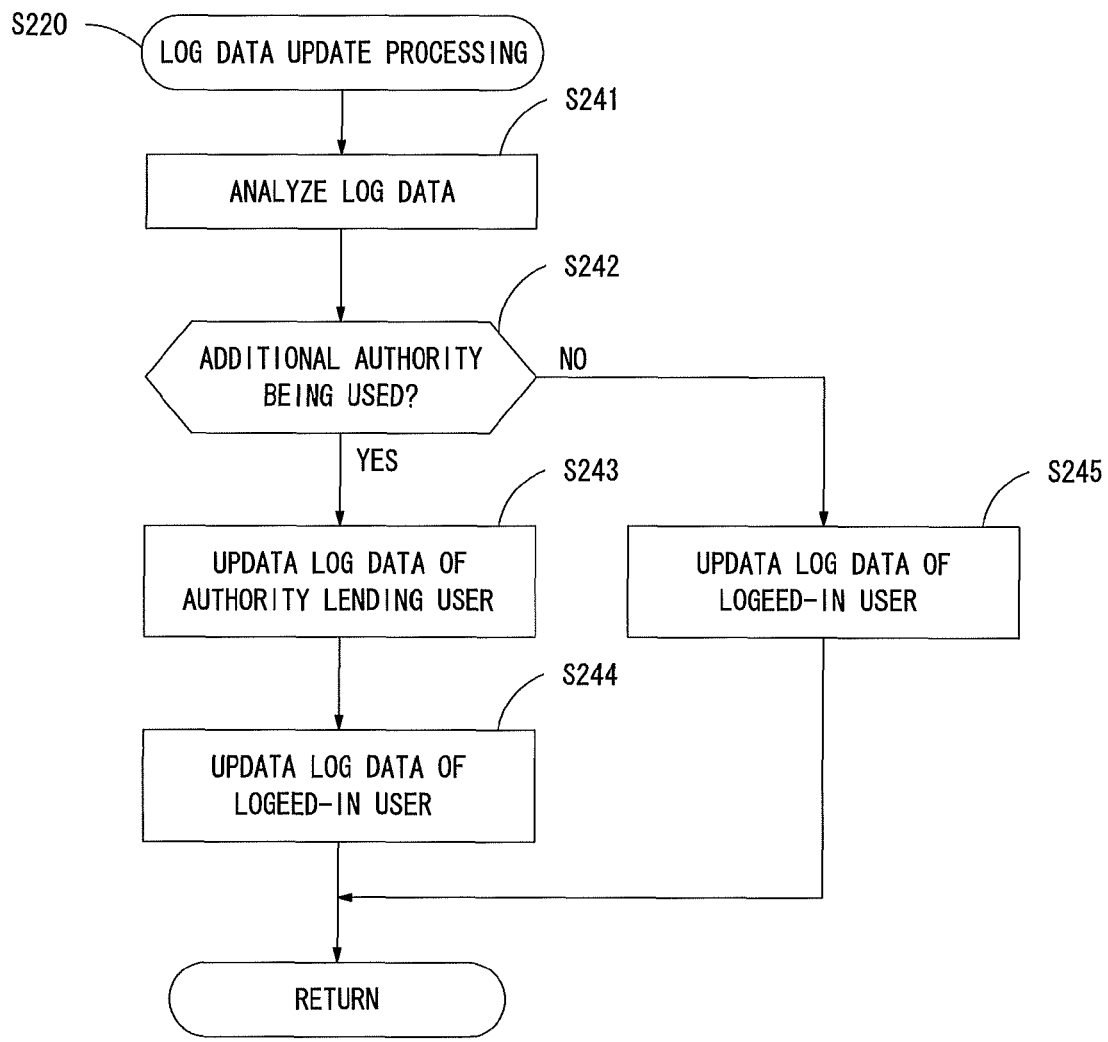
FIG. 24 is a flow diagram for explaining an exemplary detailed process sequence of log data update processing in the authentication server.

FIG. 24 is a flow diagram for explaining an exemplary detailed process sequence of the log data update processing (step S220) in the authentication server 12. When receiving log data, the CPU 41 analyzes the log data (step S241) to determine whether or not additional authority is used (step S242). When additional authority is used (when a result of step S242 is YES), the CPU 41 updates log data of the authority lending user of the log data 57 stored in the storage unit 46 (step S243). That is, log data indicating that the job is executed while authority is lent to a logged-in user is additionally recorded to update log data of the authority lending user. The CPU 41 then updates log data of the logged-in user of the log data 57 stored in the storage unit 46 (step S244). That is, log data indicating that the job is executed while authority of the authority lending user is borrowed is additionally recorded to update log data of a logged-in user.

When additional authority is not used as a result of analysis of the received log data (when a result of step S242 is NO), the CPU 41 updates log data of a logged-in user of log data 57 stored in the storage unit 46 (step S245).

Returning to FIG. 22, if input signal received from the authentication server 12 is not even log data (when a result of step S219 is NO), the CPU 41 executes other processing responsive to the received input signal (step S221). Other processing includes log out processing, for instance. Processing of the authentication server is thus completed.

In the first preferred embodiment as described above, as establishing data communication with the authentication server 12, the image forming apparatus 1 executes variety of processing for user authentication and function extension. When additional authentication of the second user results in success while the first user is logging into the image forming apparatus 1, the image forming apparatus 1 adds the second user's authority to the first user's authority to enable at least one function, thereby extending at least one function available for the first user who is logging into the image forming apparatus 1. As a result, in the first preferred embodiment, even while the first user for that certain function of the image forming apparatus 1 is not available is logging in, the certain function is made temporary available for the first user.

Furthermore, in case of executing additional authentication of the second user while the first user is logging in, log out operation of the first user is not required, resulting in improvement of operability of the image forming apparatus 1.

In the first preferred embodiment, even in case that a job is executed while function of the image forming apparatus 1 is extended, it can be recognized that the job is executed based on whose authority, one of the first user or the second user. So, history can be recorded accurately to each log of a logged-in user and an authority lending user. For instance, even in case that the first user unauthorized to use color copy function asked the second user authorized to use color copy function for performing additional authentication, thereby using color copy function while function extension is executed, history in which borrowing and lending relationship of authority being clearly specified is recorded. So, even when fees related to color copy is being charged after that, the first user who actually performed the job is charged. Charging control is thus accurately performed.

Furthermore, in the first preferred embodiment, when executing function extension, the image forming apparatus 1 specifies additional authority for the first user corresponding to the status of the image forming apparatus 1 at the time of execution of authentication of the second user, and adds the specified authority of authority set in advance for the second user. As a result, of authority set for the second user, only information related to additional authority for the first user of authority set for the second user is necessary to be transmitted and received at the time of function extension. So, the load for transmitting and receiving data in the image forming apparatus 1 and the authentication server 12 and the load on the network 10 are able to be reduced, resulting in efficient processing.

According to the first preferred embodiment, when the second user is authenticated while function available for the first user is being enabled, authority set in advance for the second user is added to the authority of the first user, and at least one function available for the first user is extended based on additional authority. Therefore, when certain function is not available for the first user while at least one function available for the first user is being enabled, user authentication of the second user who is authorized to use the certain function is additionally executed. As a result, at least one function available for the first user is extended, so that the certain function is made temporary available for the first user.
(Second Preferred Embodiment)

The second preferred embodiment is explained next. In the above-described first preferred embodiment, when user authentication of the second user is executed while the first user is logging in, function extension is executed in the image forming apparatus 1 if the second user has additional authority. In contrast, in the second preferred embodiment, whether authority of the second user can be lent to another user is set in advance. When additional authentication of the second user is executed while the first user is logging in, a function is restricted to be enabled if authority is restricted to lend to other users even if the second user has additional authority.

Figure 25:
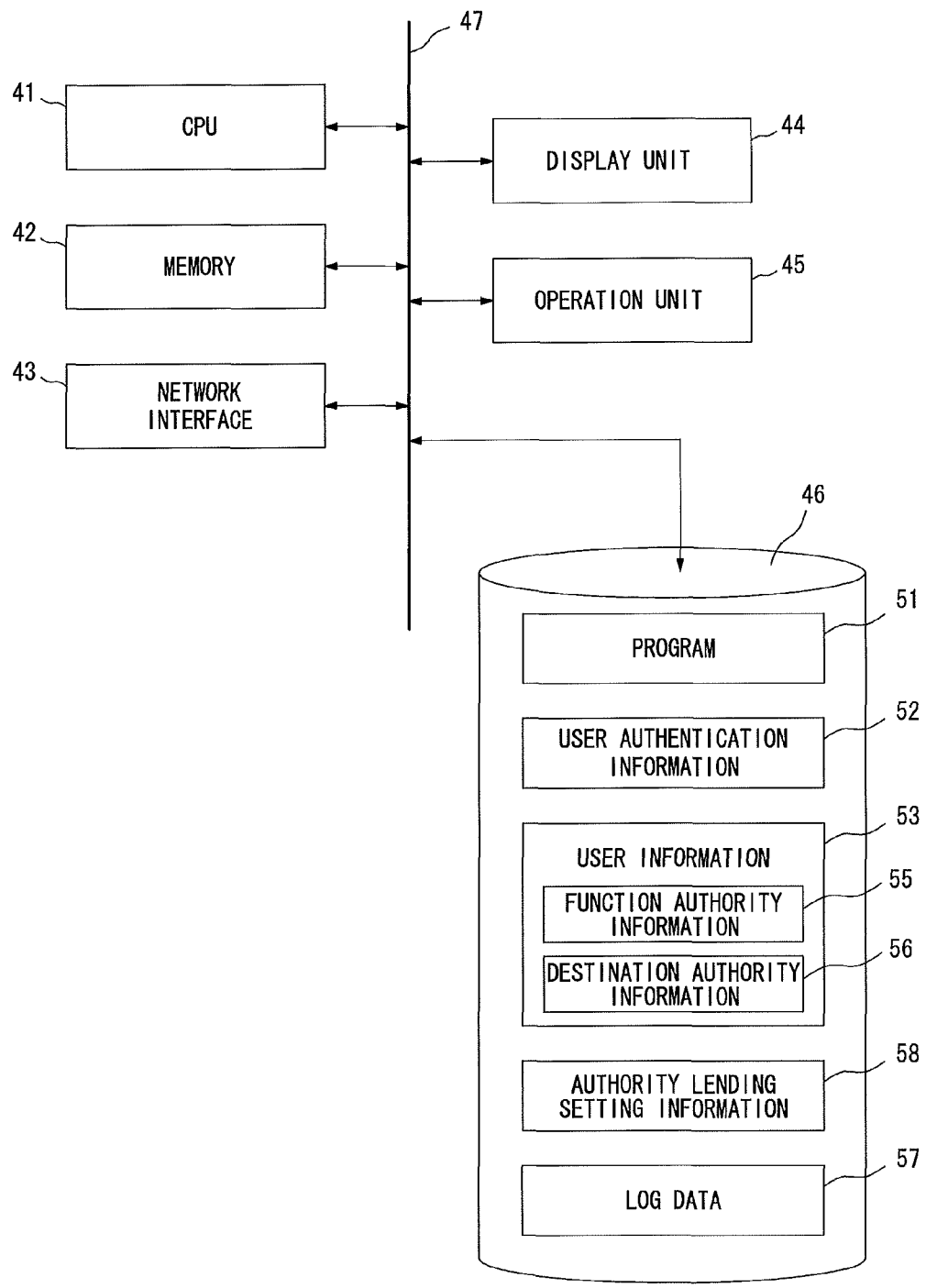
FIG. 25 is a block diagram showing the hardware configuration of the authentication server of the second preferred embodiment.

FIG. 25 is a block diagram showing the hardware configuration of the authentication server 12 of the second preferred embodiment. The difference between configurations of the authentication server 12 in the first preferred embodiment and in the second preferred embodiment is that an authority lending setting information 58 is stored in the storage unit 46. The other configurations are the same as the ones in the first preferred embodiment.

FIG. 26 shows an example of the authority lending setting information 58 stored in the storage unit 46. As illustrated in FIG. 26, the authority lending setting information 58 is consisted of a plurality of information 58*a*, 58*b* and 58*c* defined for each user who is set in advance. The authority lending setting information 58 illustrated in FIG. 26 shows an example of information regarding "user B". In case of example shown in FIG. 26, with regard to copy, the "user B" is authorized not only to make color copy but also to make copy onto A3 sheets or regular sheets. These authorities with regard to copy are allowed to lend to other users. With regard to scan, the "user B" is authorized to use function of reading a document in color and generating color data, function of transmitting to outsiders, function of transmitting by fax, and the like. Of these authorities with regard to scan, authority to use function of reading a document in color and generating color data is allowed to lend to other users. However, authority to use functions of transmitting to outsiders and that of transmitting by fax is restricted to lend to other users. Furthermore, the "user B" may transmit data by e-mail, by fax and with FTP. Destinations selectable for data transmission are registered in advance corresponding to each function. However, in case of FIG. 26, these registered destinations are restricted to lend to other users.

The "user B" is identified as an authority lending user in a request for transmission of additional authority received from the image forming apparatus 1. In such a case, even if the user B has additional authority, the authentication server 12 restricts addition of authority to the logged-in user when authority is defined to restrict lending to other users in the authority lending setting information 58*a*.

Figure 27:
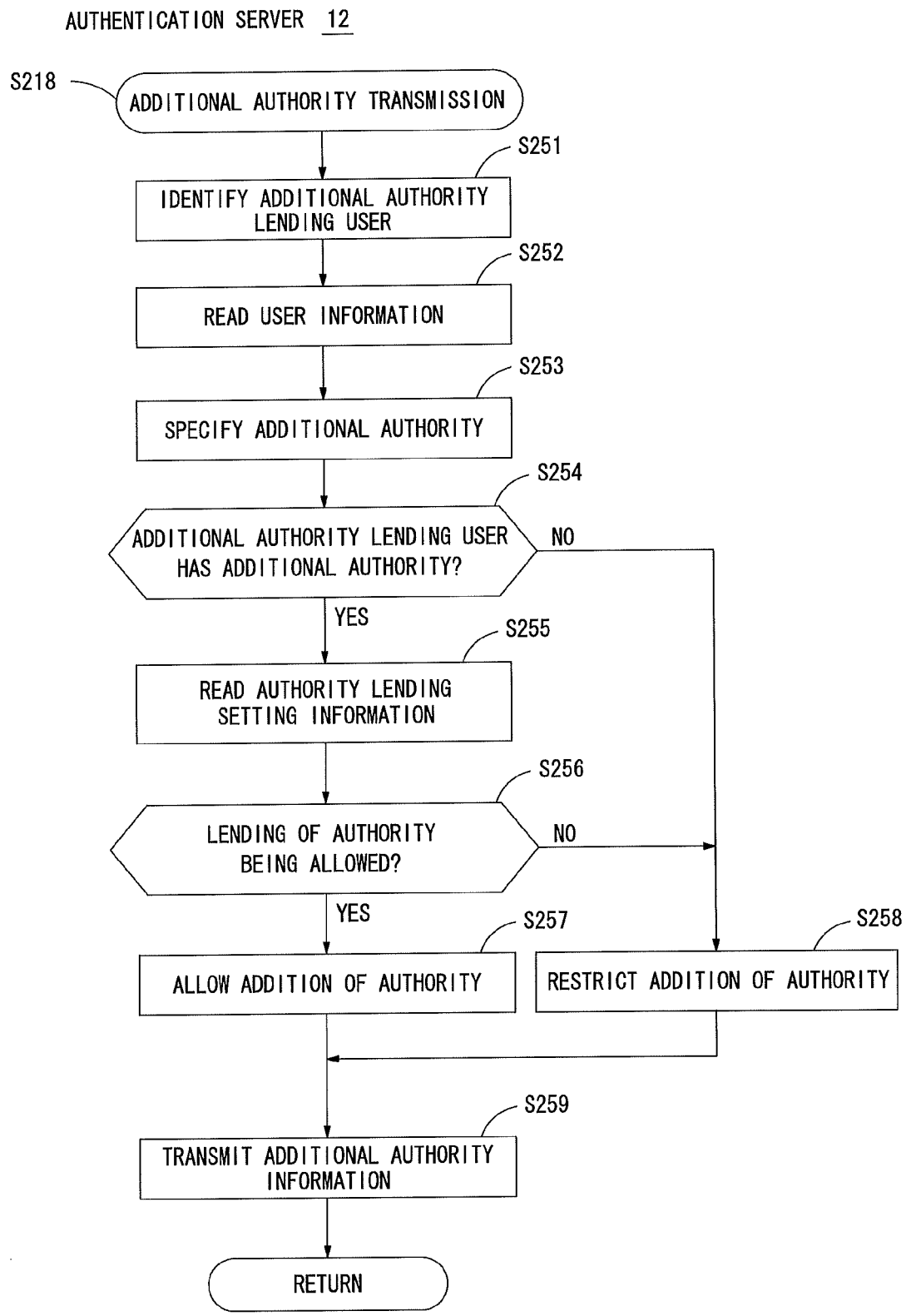
FIG. 27 is a flow diagram for explaining an exemplary detailed process sequence of additional authority transmission in the authentication server of the second preferred embodiment.

FIG. 27 is a flow diagram for explaining an exemplary detailed process sequence of the additional authority transmission (step S218 in FIG. 22) in the authentication server 12 of the second preferred embodiment. In the second preferred embodiment, alternative to a flow diagram illustrated in FIG. 23 which has been explained in the first preferred embodiment, processing based on the flow diagram illustrated in FIG. 27 is executed. As receiving a request for transmission of additional authority, the CPU 41 identifies an authority lending user based on information included in the request (step S251). The CPU 41 then reads user information of the authority lending user from the user information 53 stored in the storage unit 46 (step S252). The CPU 41 also specifies additional authority for authority of a logged-in user based on the request for additional authority (step S253), and determines whether or not the authority lending user has additional authority based on user information of the authority lending user (step S254).

If the authority lending user has additional authority for the authority of the logged-in user (when a result of step S254 is YES), the CPU 41 reads the authority lending setting information 58 of the authority lending user (step S255), and determined whether or not the authority of the authority lending user is allowed to lend to other users (step S256). If the authority of the authority lending user is allowed to lend to other users (when a result of step S256 is YES), the CPU 41 allows addition of authority.

If the authority lending user does not have additional authority for authority of the logged-in user (when a result of step S254 is NO) or if authority of the authority lending user is restricted to lend to other users (when a result of step S256 is NO), the CPU 41 restricts addition of authority (step S258). The CPU 41 generates additional authority information corresponding to a result of processing executed in step S257 or step S258, and transmits the information generated thereby to the image forming apparatus 1 (step S259). When, for example, addition of authority is allowed, additional authority information includes information defining that addition of authority is allowed and information related to additional authority of the authority lending user are generated, and transmitted. When addition of authority is restricted, additional authority information includes information showing that addition of authority is restricted is generated, and transmitted. So, when the authentication server 12 allows addition of authority, function extension is executed in the image forming apparatus 1. However, when the authentication server 12 restricts addition of authority, function extension is not executed in the image forming apparatus 1.

Thus in the second preferred embodiment, it is set whether or not authority of each user set in advance as a user who uses the image forming apparatus 1 is allowed to be lent to other users. When additional authentication is performed by the second user while the first user is logging into the image forming apparatus 1, the second user's authority is added to the first user's authority to execute function extension if it is set to allow lending to other users for settings of the second user's authority to be added to the first user's authority. If it is set to restrict lending to other users for settings of the second user's authority, function extension is not executed in the image forming apparatus 1.

Significant authority corresponding to functions available for only specific users (for example, authority to change settings made by an administrator), authority to designate destinations to which only the specific users may transmit, and others are restricted to lend to other users in advance. As a result, those authorities are prevented to be used by other users.

Modifications

While the preferred embodiments of the present invention have been described above, the present invention is not limited to these preferred embodiments. Various modifications may be applied to the present invention.

By way of example, while user authentication or function extension is executed with data communication being established between the image forming apparatus 1 and the authentication server 12 of the above-described preferred embodiments, the image forming apparatus 1 may alternatively be equipped with above-described functions of the authentication server 12. Still alternatively, above-described functions of the authentication server 12 may be shared with a plurality of servers.

Figure 28:
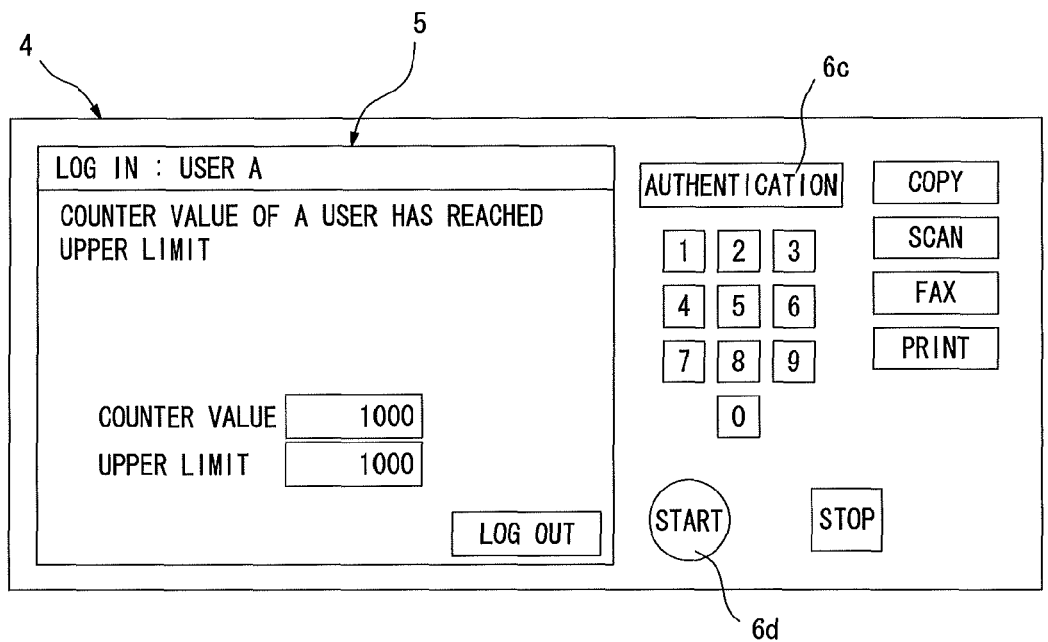
FIG. 28 shows a display screen displayed before function relating to meter count is extended.
Figure 29:
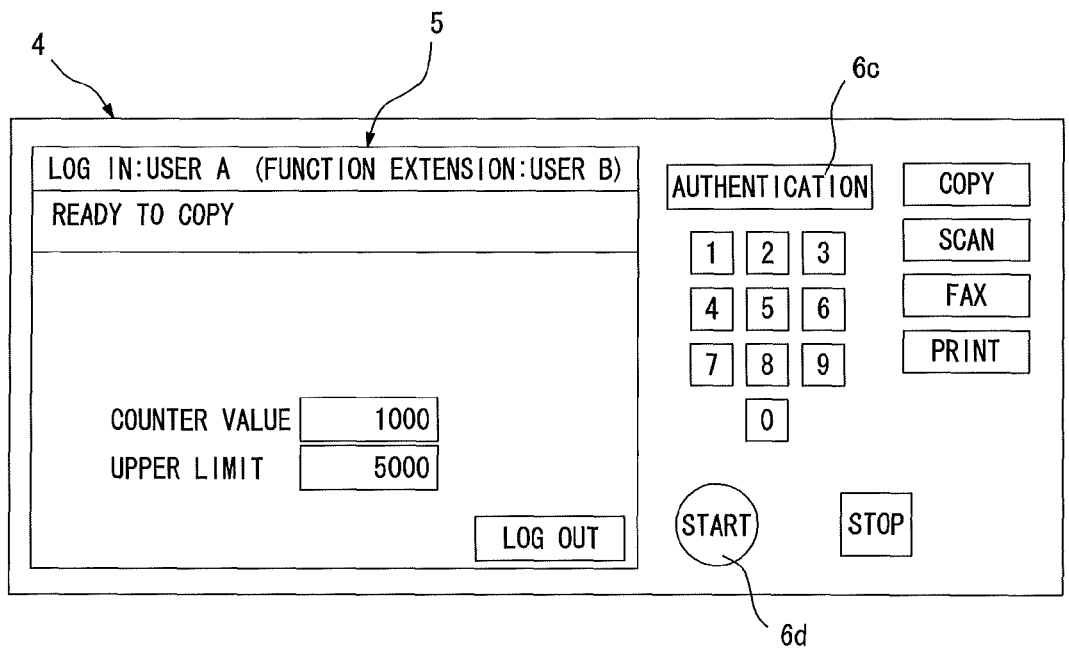
FIG. 29 shows a display screen displayed after function relating to meter count is extended.

By way of example, while addition of authority to use functions of color copy or authority regarding destinations is explained in the preferred embodiments described above, the authority of the second user to be added to the authority of the first user is not limited to these preferred embodiments. So, every authority which is able to be set for each user in the image forming apparatus 1 may be additional authority for authority of the first user. For instance, function of counting the number of copies made by instructions of a user so called function of meter count for copy may be set for each user. In this case, while the first user logs into the image forming apparatus 1 to perform copy job, the first user is not able to make copy in a state where his or her count value has reached the upper limit. Even in such a case, if additional authentication of the second user is executed, copy function is made available for the first user by using the function of meter count for copy of the second user. FIG. 28 and FIG. 29 are exemplary change of display screen of the operational panel 4 in response to extension of function relating to meter count for copy. FIG. 28 shows a display screen displayed before execution of function extension, and FIG. 29 shows a display screen displayed after execution of function extension. At the time of user A logs into the image forming apparatus 1, count value of copy made by instructions of the user A has reached the upper limit which is set in advance as illustrated in FIG. 28. If user authentication of user B is executed by the operation of the authentication key 6*c* under this condition, the image forming apparatus 1 executes function extension by using authority of the user B with remaining a logged-in state of the user A. As a result, the user B's count value and upper limit are added on to the user A's count value and upper limit, and the display screen as illustrated in FIG. 29 is shown. As illustrated in FIG. 29, the user B's count value is added on to the user A's count value, thereby making copy function available for the user A with authority of the user B.

In the first preferred embodiment described above, as executing function extension in the image forming apparatus 1, additional authority for the authority of the first user is specified corresponding to the status of the image forming apparatus 1 at the time of authentication of the second user, and the specified authority is added. However, in the present invention, addition of authority corresponding to the status is not always necessary. So, for example, when the image forming apparatus 1 executes authentication of the second user, every authority of the second user may be added to authority of the first user.

In the preferred embodiments described above, authentication information is read from the authentication information recording medium 9 such as IC card as an example of user authentication. However, the present invention is not limited to the configuration. User authentication may be, for example, vein authentication by reading user's vein pattern to execute user authentication or finger print authentication by reading user's finger print pattern to execute user authentication. Moreover user authentication may be executed by manually imputing user ID, password and the like by operating the operational panel 4 by a user.

While the invention has been shown and described in detail, the foregoing description is in all aspects illustrative and not restrictive. It is therefore understood that numerous modifications and variations can be devised without departing from the scope of the invention.

What is claimed is:

1. An image forming apparatus, comprising:
   a user authentication part executing authentication of a user;
   a function enabling part enabling at least one function available for a first user based on authority of the first user set in advance when authentication of the first user executed by said user authentication part results in success; and
   a function extending part extending at least one function available for the first user by adding authority set in advance for a second user in addition to authority of the first user when authentication of the second user executed by said user authentication part results in success with at least one function available for the first user being enabled, wherein
   said function extending part specifies additional authority for authority of the first user corresponding to the status of the image forming apparatus at time of authentication of the second user executed by said user authentication part, and adds the specified authority of authority set in advance for the second user,
   wherein the status of the image forming apparatus includes fax, copy, print and scan.

2. The image forming apparatus according to claim 1, further comprising:
   a display part capable of displaying various types of information,
   wherein said display part displays at least one function enabled by said function enabling part in a form operable for the first user, also displays at least one extended function in a form operable for the first user when at least one function available for the first user is extended by said function extending part.

3. The image forming apparatus according to claim 1, wherein
   whether or not lending authority to other users is allowed is set in advance for authority of the second user,
   said function extending part adds to authority of the first user when authority of the second user is set to allow lending, while not adding to authority of the first user when authority of the second user is set to restrict lending.

4. The image forming apparatus according to claim 1, further comprising:
   a log recording part for recording log in accordance with execution of a job, wherein
   said log recording part generates log data indicating the job performed by the first user is executed with authority of the second user and records said log data for the first user and the second user when a job is executed based on at least one extended function with at least one function available for the first user being extended by said function extending part.

5. A function extending method of extending at least one function available for a user in an image forming apparatus, wherein the method comprises the steps of:
   (a) executing, by the image forming apparatus, user authentication of a first user;
   (b) enabling at least one function available for the first user based on authority of the first user set in advance when authentication of the first user results in success;
   (c) executing user authentication of a second user with at least one function available for the first user being enabled; and
   (d) adding authority of the second user in addition to said authority of the first user based on authority set in advance for the second user, and extending at least one function
   available for the first user when authentication of the second user results in success, and
   in said step (d), additional authority for authority of the first user is specified corresponding to the status of said image forming apparatus at time of authentication of the second user executed in said step (c), and the specified authority of authority set in advance for the second user is added,
   wherein the status of the image forming apparatus includes fax, copy, print and scan.

6. The function extending method according to claim 5, wherein
   in said step (b), at least one enabled function is displayed in a form being operable for the first user on a display part as at least one function available for the first user is enabled,
   in said step (d), at least one extended function is displayed in a form being operable for the first user on said display part as at least one function available for the first user is extended.

7. The function extending method according to claim 5, wherein
   whether or not lending authority to other users is allowed is set in advance for authority of the second user, and
   in said step (d), addition to authority of the first user is executed when authority of the second user is set to allow lending, while not executing addition to authority of the first user when authority of the second user is set to restrict lending.

8. The function extending method according to claim 5, wherein the method further comprises the step of:
   (e) recording log in accordance with execution of a job, and
   in said step (e), when the job is executed based on at least one extended function with at least one function available for the first user being extended in said step (d), log data indicating the job performed by the first user and executed with authority of the second user is generated and recorded therein as log data of the first user and the second user.

9. An user authentication system comprising an image forming apparatus and an authentication server being capable of establishing data communication with each other, wherein said image forming apparatus includes:

a user authentication part for giving a request for authentication to said authentication server and executing user authentication based on a result of authentication processing executed in said authentication server; a function enabling part for acquiring information relating to authority of a first user, and enabling at least one function available for the first user when said authentication processing of the first user results in success; and a function extending part for acquiring information relating to a second user and extending at least one function available for the first user by adding authority set in advance for the second user in addition to authority of the first user when said authentication processing of the second user results in success with at least one function available for the first user being enabled, said function extending part specifies additional authority for authority of the first user corresponding to the status of the image forming apparatus at the time of the authentication of the second user executed by said user authentication part, and adds the specified authority of authority set in advance for the second user, wherein the status of the image forming apparatus includes fax, copy, print and scan, and said authentication server includes:

an authentication processing part for executing said authentication processing responsive to said authentication request from said user authentication part;

a user information transmission part for transmitting information relating to the first user based on a request from said function enabling part, and an additional authority transmission part for transmitting information relating to the second user based on a request from said function enabling part.

10. The user authentication system according to claim 9, wherein said image forming apparatus further includes:

a display part capable of displaying various types of information, and said display part displays at least one function enabled by said function enable part in a form operable for the first user, also displays at least one extended function in a form operable for the first user when at least one function available for the first user is extended by said function extending part.

11. The user authentication system according to claim 9, wherein whether or not lending authority to other users is allowed is set in advance for authority of the second user, and said function extending part adds to authority of the user when authority of the second user is set to allow lending, while not adding to authority of the user when authority of the second user is set to restrict lending.

12. The user authentication system according to claim 9, wherein said image forming apparatus further includes:

a log recording part for recording log in accordance with execution of a job, and when a job is executed based on at least one extended function with at least one function available for the first user being extended by said function extending part, said log recording part generation log data indicating the job performed by the first user is executed with authority of the second user, and records said log data for the first user the second user.

* * * * *